(12) United States Patent
Cleghorn et al.

(10) Patent No.: US 11,541,289 B2
(45) Date of Patent: *Jan. 3, 2023

(54) GOLF CLUB HAVING REMOVABLE WEIGHT

(71) Applicant: Acushnet Company, Fairhaven, MA (US)

(72) Inventors: Richard L. Cleghorn, Oceanside, CA (US); David Cornelius, San Marcos, CA (US); Hiroshi Kawaguchi, Aliso Viejo, CA (US); Dustin Barksdale, San Marcos, CA (US)

(73) Assignee: Acushnet Company, Fairhaven, MA (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/318,271

(22) Filed: May 12, 2021

(65) Prior Publication Data

US 2021/0260449 A1    Aug. 26, 2021

Related U.S. Application Data

(63) Continuation of application No. 16/725,622, filed on Dec. 23, 2019, now Pat. No. 11,013,966, which is a continuation-in-part of application No. 16/224,478, filed on Dec. 18, 2018, now Pat. No. 10,518,145, which is a continuation-in-part of application No. 16/043,052, filed on Jul. 23, 2018, now Pat. No. 10,376,756, which is a continuation of application
(Continued)

(51) Int. Cl.
*A63B 53/06* (2015.01)
*A63B 60/52* (2015.01)
*A63B 60/02* (2015.01)
*A63B 53/04* (2015.01)

(52) U.S. Cl.
CPC .......... *A63B 53/06* (2013.01); *A63B 53/0466* (2013.01); *A63B 60/02* (2015.10); *A63B 60/52* (2015.10); *A63B 53/0433* (2020.08); *A63B 2053/0491* (2013.01); *A63B 2053/0495* (2013.01)

(58) Field of Classification Search
CPC .......... A63B 53/06; A63B 60/02; A63B 60/52; A63B 53/0466; A63B 53/0433; A63B 2053/0491; A63B 2053/0495
See application file for complete search history.

(56) References Cited

U.S. PATENT DOCUMENTS

| 1,322,182 A | 11/1919 | Duncan |
| 1,534,600 A | 4/1925 | Mattern |
| 2,155,830 A | 4/1939 | Howard |

(Continued)

FOREIGN PATENT DOCUMENTS

| JP | 01043278 | 2/1989 |
| JP | 2005296582 | 10/2005 |

(Continued)

*Primary Examiner* — William M Pierce
(74) *Attorney, Agent, or Firm* — Ryan A. Reis

(57) ABSTRACT

A golf club head includes a club head body and a weight member that is secured to the body. The weight member is constructed to utilize lateral forces to couple to the head body to minimize the structure required to retain the weight member, and the weight member is preferably constructed so that it has a low profile.

20 Claims, 29 Drawing Sheets

Related U.S. Application Data

No. 15/339,797, filed on Oct. 31, 2016, now Pat. No. 10,029,161.

(56) References Cited

U.S. PATENT DOCUMENTS

| | | | |
|---|---|---|---|
| 3,220,733 A | 11/1965 | Saleeby | |
| 1,085,934 A | 4/1978 | Churchward | |
| 4,150,464 A | 4/1979 | Tracy | |
| 4,869,507 A | 9/1989 | Sahm | |
| 5,050,879 A | 9/1991 | Sun | |
| 5,230,509 A | 7/1993 | Chavez | |
| 5,316,305 A | 5/1994 | McCabe | |
| 5,720,674 A | 2/1998 | Galy | |
| 5,794,316 A | 8/1998 | Anscher | |
| 5,935,019 A | 8/1999 | Yamamoto | |
| 6,123,627 A | 9/2000 | Antonious | |
| 6,277,032 B1 | 8/2001 | Smith | |
| 6,409,612 B1 | 6/2002 | Evans | |
| 6,458,044 B1 | 10/2002 | Vincent et al. | |
| 6,592,468 B2 | 7/2003 | Vincent | |
| 6,663,505 B1 | 12/2003 | Solari | |
| 6,860,818 B2 | 3/2005 | Mahaffey | |
| 6,902,432 B2 | 6/2005 | Morikawa | |
| 7,166,041 B2 | 1/2007 | Evans | |
| 7,186,190 B1 | 3/2007 | Beach | |
| 7,604,548 B2 | 10/2009 | Cole | |
| 7,628,711 B2 | 12/2009 | Akinori | |
| 7,704,163 B2 | 4/2010 | Stites | |
| 7,758,452 B2 | 7/2010 | Soracco | |
| 7,775,905 B2 | 8/2010 | Beach | |
| 7,871,339 B2 | 1/2011 | Sanchez | |
| 8,192,303 B2 | 6/2012 | Ban | |
| 8,206,243 B2 | 6/2012 | Stites | |
| 8,444,505 B2 | 5/2013 | Beach | |
| 8,790,195 B1 | 7/2014 | Myers | |
| 8,944,934 B2 | 2/2015 | Yamamoto | |
| 9,180,349 B1 | 11/2015 | Seluga | |
| 9,211,453 B1 | 12/2015 | Foster | |
| 9,259,627 B1 | 2/2016 | Myers | |
| 9,289,660 B1 | 3/2016 | Myers | |
| 9,364,728 B1 | 6/2016 | Myers | |
| 9,387,376 B1 | 7/2016 | Hall | |
| 9,387,377 B2 | 7/2016 | Liang et al. | |
| 9,440,126 B2 | 9/2016 | Boyd | |
| 9,550,097 B1 * | 1/2017 | Myers | A63B 53/047 |
| 9,561,413 B2 | 2/2017 | Nielson | |
| 9,597,561 B1 | 3/2017 | Seluga | |
| 9,597,563 B2 | 3/2017 | Voshall | |
| 9,623,302 B1 | 4/2017 | Myers | |
| 9,636,553 B1 | 5/2017 | Myers | |
| 9,682,296 B1 | 6/2017 | Myers | |
| 9,694,256 B2 | 7/2017 | Myers | |
| 9,694,261 B2 | 7/2017 | Nunez | |
| 9,700,767 B2 | 7/2017 | Zimmerman | |
| 9,700,770 B2 | 7/2017 | Cleghorn | |
| 9,707,458 B2 | 7/2017 | Luttrell | |
| 9,707,459 B1 | 7/2017 | Myers | |
| 9,731,175 B1 | 8/2017 | Myers | |
| 9,744,415 B2 | 8/2017 | Frame | |
| 9,757,630 B2 | 9/2017 | Mata | |
| 9,868,036 B1 | 1/2018 | Kleinert | |
| 9,878,223 B2 | 1/2018 | Foster | |
| 9,914,028 B1 | 3/2018 | Cleghorn | |
| 9,937,392 B2 | 4/2018 | Myers | |
| 9,975,019 B2 | 5/2018 | Frame et al. | |
| 10,029,161 B2 | 7/2018 | Knutson | |
| 10,035,051 B2 | 7/2018 | Cleghorn | |
| 10,065,094 B2 | 9/2018 | Wallin | |
| 10,137,342 B2 | 11/2018 | Hebreo | |
| 10,183,203 B1 | 1/2019 | Yi | |
| 10,188,916 B2 | 1/2019 | Harbert | |
| 10,213,665 B1 | 2/2019 | Day | |
| 10,391,368 B2 | 8/2019 | Cleghorn | |
| 10,398,952 B1 | 9/2019 | Sang | |
| 10,518,145 B2 * | 12/2019 | Cleghorn | A63B 53/06 |
| 10,543,406 B2 | 1/2020 | Carter | |
| 10,556,161 B2 | 2/2020 | Jertson | |
| 10,576,337 B2 | 3/2020 | Saracco | |
| 10,695,628 B1 | 6/2020 | Sang | |
| 2006/0122004 A1 | 6/2006 | Chen | |
| 2008/0020861 A1 | 1/2008 | Adams | |
| 2008/0132353 A1 | 6/2008 | Hsiao | |
| 2008/0188322 A1 * | 8/2008 | Anderson | A63B 60/00 29/527.4 |
| 2008/0261715 A1 | 10/2008 | Carter | |
| 2009/0143167 A1 | 6/2009 | Evans | |
| 2009/0221380 A1 | 9/2009 | Breier | |
| 2010/0075773 A1 | 3/2010 | Casati | |
| 2010/0113183 A1 | 5/2010 | Soracco | |
| 2010/0167837 A1 | 7/2010 | Ban | |
| 2010/0323815 A1 | 12/2010 | Bezilla et al. | |
| 2014/0024475 A1 | 1/2014 | Yuki | |
| 2014/0080628 A1 | 3/2014 | Sargent | |
| 2015/0306473 A1 | 10/2015 | Breier | |
| 2015/0321055 A1 | 11/2015 | Golden | |
| 2016/0166894 A1 | 6/2016 | Curtis | |
| 2017/0173413 A1 | 6/2017 | Cleghorn | |
| 2017/0173420 A1 | 6/2017 | Frame | |
| 2017/0312600 A1 | 11/2017 | Luttrell | |
| 2018/0326267 A1 | 11/2018 | de la Cruz et al. | |
| 2019/0105544 A1 | 4/2019 | Carter | |
| 2019/0118050 A1 * | 4/2019 | Cleghorn | A63B 60/52 |
| 2019/0329104 A1 * | 10/2019 | de la Cruz | A63B 60/02 |
| 2020/0330834 A1 | 10/2020 | Northcutt | |
| 2020/0330836 A1 | 10/2020 | Bennett | |

FOREIGN PATENT DOCUMENTS

| | | |
|---|---|---|
| JP | 2005323978 | 11/2005 |
| JP | 2006320493 | 11/2006 |
| JP | 2010069106 | 4/2010 |
| JP | 2010136772 | 6/2010 |
| JP | 2010148702 | 7/2010 |
| JP | 2020252964 | 11/2010 |
| JP | 2012125291 | 7/2012 |
| JP | 20122139450 | 7/2012 |
| JP | 2014223548 | 12/2014 |

* cited by examiner

GOLF CLUB HAVING REMOVABLE WEIGHT

CROSS-REFERENCE TO RELATED APPLICATIONS

The present application is a continuation of co-pending U.S. patent application Ser. No. 16/725,622, filed on Dec. 23, 2019, which is a continuation-in-part of U.S. patent application Ser. No. 16/224,478, filed on Dec. 18, 2018, now U.S. Pat. No. 10,518,145, which is a continuation-in-part of U.S. patent application Ser. No. 16/043,052, filed on Jul. 23, 2018, now U.S. Pat. No. 10,376,756, which is a continuation of U.S. patent application Ser. No. 15/339,797, filed on Oct. 31, 2016, now U.S. Pat. No. 10,029,161, the disclosures of which are incorporated by reference in their entireties.

FIELD OF THE INVENTION

The invention relates to golf clubs, and more particularly, to golf club heads having a removable weight.

BACKGROUND OF THE INVENTION

The trend of lengthening golf courses to increase their difficulty has resulted in a high percentage of amateur golfers constantly searching for ways to achieve more distance from their golf shots. The golf industry has responded by providing golf clubs specifically designed with distance and accuracy in mind. The size of wood-type golf club heads has generally been increased while multi-material construction and reduced wall thicknesses have been included to provide more mass available for selective placement through the head. The discretionary mass placement has allowed the club to possess a higher moment of inertia (MOI), which translates to a greater ability to resist twisting during off-center ball impacts and less of a distance penalty for those off-center ball impacts.

Various methods are used to selectively locate mass throughout golf club heads, including thickening portions of the body casting itself or strategically adding a separate weight element during the manufacture of the club head. An example, shown in U.S. Pat. No. 7,186,190, discloses a golf club head comprising a number of moveable weights attached to the body of the club head. The club head includes a number of threaded ports into which the moveable weights are screwed. Though the mass characteristics of the golf club may be manipulated by rearranging the moveable weights, the cylindrical shape of the weights and the receiving features within the golf club body necessarily moves a significant portion of the mass toward the center of the club head, which may not maximize the peripheral weight of the club head or the MOI.

Alternative approaches for selectively locating mass in a club head utilize the incorporation of composite structures of multiple materials. These composite structures often utilize two, three, or more materials, including various metallic and non-metallic materials, that have different physical properties including different densities. An example of this type of multi-material head is shown in U.S. Pat. No. 5,720,674. The club head comprises an arcuate portion of high-density material bonded to a recess in the back-skirt. Because the different materials included in the club head must be coupled, for example by welding, swaging, or using bonding agents such as epoxy, they may be subject to delamination or corrosion over time. This component delamination or corrosion results in decreased performance in the golf club head and can lead to club head failure.

Though many methods of optimizing the mass properties of golf club heads exist, there remains a need in the art for a golf club head comprising at least a removable weight having secure attachment and a low-profile so that the weight does not protrude into the center of the club head and negatively affect the location of the center of gravity.

SUMMARY OF THE INVENTION

The present invention is directed to a golf club head having at least one weight receptacle and at least one movable or removable weight member.

One non-limiting embodiment of the present technology includes a golf club head including a weight member, including a club head body including a plurality of body members that combine to define a hollow body, wherein the body members include a face defining a ball-striking surface, a sole, a crown, and a skirt, wherein the sole extends aftward from a lower edge of the face, wherein the crown extends aftward from an upper edge of the face, and wherein the skirt extends between the sole and the crown around a perimeter of the body; a weight mount disposed on at least one of the body members, wherein the weight mount includes an aperture defined by an outer surface of the golf club head body, wherein the weight mount defines an undercut adjacent the aperture; and a weight member including a weight body, a spring clip, and a locking mechanism, wherein the weight body includes a first flange that is spaced from a second flange by a clip portion, wherein the weight body defines a bore that extends through the first flange and at least a portion of the clip portion, wherein the clip portion defines a plurality of apertures extending radially through the clip portion, wherein the spring clip is disposed on the clip portion; wherein the locking mechanism includes a locking member and a plurality of rollers, wherein each of the plurality of rollers are disposed in one of the plurality of apertures in the clip portion, and wherein each of the rollers abuts a cam surface of the locking member and an inner surface of the spring clip; wherein the cam surface of the locking member includes a plurality of detents and a plurality of ramps, wherein the cam surface of the locking member has an outer dimension that is different at different locations around the locking member from a minimum distance at a detent to a maximum dimension on a ramp, wherein the locking member is rotatably coupled to the weight body, wherein the spring clip is biased toward the center of the weight member, wherein in a first configuration of the weight member the lock member is oriented so that the plurality of rollers are aligned with the plurality of detents and the spring clip forcibly abuts the rollers, and wherein in a second configuration of the weight member the lock member is oriented so that the rollers forcibly abut the spring clip to force the spring clip outward and away from the clip portion of the weight body and into the undercut.

In an additional non-limiting embodiment of the present technology the golf club head includes a plurality of weight mounts.

In an additional non-limiting embodiment of the present technology the spring clip comprises a clip alignment feature, wherein the weight body comprises a body alignment feature, wherein the clip alignment feature engages the body alignment feature In an additional non-limiting embodiment of the present technology the locking member includes a circumferential groove in an outer surface, and the weight body includes a circumferential groove in an inner surface formed by the bore, wherein a snap ring extends into the circumferential groove of the locking member and the circumferential groove of the weight body so that the locking member is rotatably coupled to the weight body in the bore.

In an additional non-limiting embodiment of the present technology the plurality of rollers are a plurality of balls.

In an additional non-limiting embodiment of the present technology the weight body includes at least one indicium, wherein the locking member includes at least one indicium, and wherein alignment of the at least one indicium of the weight body and the at least one indicium of the locking member corresponds to one of the first configuration of the weight member and the second configuration of the weight member.

In an additional non-limiting embodiment of the present technology the first flange of the weight body is annular, the second flange of the weight body is annular, and the clip portion of the weight body is annular.

In an additional non-limiting embodiment of the present technology the weight mount includes an outer portion that is tapered, wherein the first flange of the weight body is tapered, wherein the first flange abuts the tapered outer portion of the weight mount.

In an additional non-limiting embodiment of the present technology the weight mount includes an inner portion that is tapered, wherein an edge of the spring clip is tapered, wherein the tapered surface of the spring clip abuts the tapered inner portion of the weight mount.

An additional non-limiting embodiment of the present technology includes a flange gasket interposed between the first flange and an outer surface of the golf club head.

An additional non-limiting embodiment of the present technology includes a weight member for a golf club head, including a weight body including a first flange that is spaced from a second flange by a clip portion, wherein the weight body defines a bore that extends through the first flange and at least a portion of the clip portion, wherein the clip portion defines a plurality of apertures extending radially through the clip portion; a spring clip disposed on the clip portion; and a locking mechanism, wherein the locking mechanism includes a locking member and a plurality of rollers, wherein each of the plurality of rollers is disposed in one of the plurality of apertures in the clip portion, and wherein each of the rollers abuts a cam surface of the locking member and an inner surface of the spring clip; wherein the cam surface of the locking member includes a plurality of detents and a plurality of ramps, wherein the locking member is rotatably coupled to the weight body, wherein the cam surface of the locking member has an outer dimension that is different at different locations around the locking member from a minimum distance at a detent to a maximum dimension on a ramp, wherein the spring clip is biased toward the center of the weight member, wherein in a first configuration of the weight member the lock member is oriented so that the plurality of rollers are aligned with the plurality of detents and the spring clip forcibly abuts the rollers into the detents, and wherein in a second configuration of the weight member the lock member is oriented so that the rollers forcibly abut the spring clip to force the spring clip outward and away from the clip portion of the weight body.

In an additional non-limiting embodiment of the present technology the spring clip comprises a clip alignment feature, wherein the weight body comprises a body alignment feature, wherein the clip alignment feature engages the body alignment feature.

In an additional non-limiting embodiment of the present technology the locking member includes a circumferential groove in an outer surface and the weight body includes a circumferential groove in an inner surface formed by the bore, wherein a snap ring extends into the circumferential groove of the locking member and the circumferential groove of the weight body so that the locking member is rotatably coupled to the weight body in the bore.

In an additional non-limiting embodiment of the present technology the plurality of rollers is a plurality of balls.

In an additional non-limiting embodiment of the present technology the weight body includes at least one indicium, wherein the locking member includes at least one indicium, and wherein alignment of the at least one indicium of the weight body and the at least one indicium of the locking member corresponds to one of the first configuration and the second configuration.

In an additional non-limiting embodiment of the present technology the first flange of the weight body is annular, the second flange of the weight body is annular, and the clip portion of the weight body is annular.

In an additional non-limiting embodiment of the present technology the weight mount includes an outer portion that is tapered, wherein the first flange of the weight body is tapered, wherein the first flange abuts the tapered outer portion of the weight mount.

In an additional non-limiting embodiment of the present technology wherein the weight mount includes an inner portion that is tapered, wherein an edge of the spring clip is tapered, wherein the tapered surface of the spring clip abuts the tapered inner portion of the weight mount.

An additional non-limiting embodiment of the present technology includes a golf club head including a weight member, including a club head body including a plurality of body members that combine to define a hollow body, wherein the body members include a face defining a ball-striking surface, a sole, a crown, and a skirt, wherein the sole extends aftward from a lower edge of the face, wherein the crown extends aftward from an upper edge of the face, and wherein the skirt extends between the sole and the crown around a perimeter of the body; a weight mount disposed on at least one of the body members, wherein the weight mount includes an aperture defined by an outer surface of the golf club head body; and a weight member including a weight body, a spring clip, and a locking mechanism, wherein the weight body defines a bore; wherein the weight body defines a plurality of apertures extending radially from the bore; wherein the spring clip is surrounds at least a portion of the weight body; wherein the locking mechanism includes a locking member and a plurality of rollers, wherein each of the plurality of rollers is disposed in one of the plurality of apertures and wherein each of the rollers abuts a cam surface of the locking member and an inner surface of the spring clip; wherein the cam surface of the locking member includes a plurality ramps, wherein the cam surface of the locking member has an outer dimension that is different at different locations around the locking member, wherein the locking member is rotatably coupled to the weight body, wherein the spring clip is biased toward the center of the weight member, wherein in a first configuration of the weight member the lock member is oriented so that the plurality of rollers are aligned with a low point of the plurality of ramps, and wherein in a second configuration of the weight member the lock member is oriented so that the rollers forcibly abut the spring clip to force the spring clip outward and away from the clip portion of the weight body, preventing the weight member from dislodging from the weight mount.

In an additional non-limiting embodiment of the present technology the weight mount includes an outer portion that is tapered, wherein a portion of the weight body is tapered, wherein the tapered portion of the weight body abuts the tapered outer portion of the weight mount when said weight member is in the second configuration.

An additional non-limiting embodiment of the present technology includes a golf club head including a weight member comprising a club head body, a weight mount, and a weight member. The weight mount is disposed in a portion of the club head body, includes an aperture defined by an outer surface of the golf club head body and at least one spline tab, and defines an undercut adjacent the aperture. The weight member comprises a weight body, a spring clip, and a locking mechanism. The weight body includes a first flange that includes at least one spline tab, and the first flange is spaced from a second flange by a clip portion. The weight body defines a bore that extends through the first flange and at least a portion of the clip portion. The clip portion defines at least one aperture extending radially through the clip portion. The spring clip is disposed on the clip portion. The locking mechanism includes a locking member and at least one roller, and the at least one roller is disposed in the at least one aperture in the clip portion. The at least one roller abuts a cam surface of the locking member and an inner surface of the spring clip. The cam surface of the locking member has an outer dimension that is different at different locations around the locking member. The locking member is rotatably coupled to the weight body. In a first configuration of the weight member the locking member is oriented so that the at least one roller is aligned with a first portion of the cam surface and the spring clip forcibly abuts the at least one roller. In a second configuration of the weight member the locking member is oriented so that the at least one roller is aligned with a second portion of the cam surface and forcibly abuts the spring clip to force the spring clip outward and away from the clip portion of the weight body and into the undercut. The spline tab of the first flange mechanically interlocks with the spline tab of the weight mount so that relative rotation between the weight body and the weight mount is prevented.

In an additional non-limiting embodiment of the present technology the golf club head includes a plurality of weight mounts.

In an additional non-limiting embodiment of the present technology the spring clip comprises a clip alignment feature that is a tab, the weight body comprises a body alignment feature that is a slot in the second flange, and the tab extends into the slot.

In an additional non-limiting embodiment of the present technology the locking member includes a circumferential groove in an outer surface, the weight body includes a circumferential groove in an inner surface formed by the bore, and a snap ring extends into the circumferential groove of the locking member and the circumferential groove of the weight body so that the locking member is rotatably coupled to the weight body in the bore.

In an additional non-limiting embodiment of the present technology the at least one roller is a ball.

In an additional non-limiting embodiment of the present technology the spring clip is biased toward the center of the weight member.

In an additional non-limiting embodiment of the present technology the first flange of the weight body is annular, the second flange of the weight body is annular, and the clip portion of the weight body is annular.

In an additional non-limiting embodiment of the present technology the weight mount includes a tapered flange, and the spring clip abuts the tapered flange when the weight member is in the second configuration.

In an additional non-limiting embodiment of the present technology the weight member further comprises a gasket disposed on the first flange of the weight body, and the gasket is disposed between the first flange and the weight mount when the weight member is located in the weight mount.

In an additional non-limiting embodiment of the present technology the cam surface of the locking member includes at least one detent and at least one ramp, and the locking member has a minimum outer dimension on the at least one detent and a maximum outer dimension on the at least one ramp.

An additional non-limiting embodiment of the present technology includes a weight member for a golf club head comprising a weight body, a spring clip, and a locking mechanism. The weight body includes a first flange that includes at least one spline tab, and that is spaced from a second flange by a clip portion. The weight body defines a bore that extends through the first flange and at least a portion of the clip portion. The clip portion defines at least one aperture extending radially through the clip portion. The spring clip is disposed on the clip portion. The locking mechanism includes a locking member and at least one roller, and the at least one roller is disposed in the at least one aperture in the clip portion. The at least one roller abuts a cam surface of the locking member and an inner surface of the spring clip. The locking member is rotatably coupled to the weight body, and the cam surface of the locking member has an outer dimension that is different at different locations around the locking member. In a first configuration of the weight member the locking member is oriented so that the at least one roller abuts a first portion of the cam surface and the spring clip forcibly abuts the at least one roller. In a second configuration of the weight member the locking member is oriented so that the at least one roller is aligned with a second portion of the cam surface and forcibly abuts the spring clip to force the spring clip outward and away from the clip portion of the weight body.

In an additional non-limiting embodiment of the present technology the spring clip comprises a clip alignment feature that is a tab, the weight body comprises a body alignment feature that is a slot in the second flange, and the tab extends into the slot.

In an additional non-limiting embodiment of the present technology the locking member includes a circumferential groove in an outer surface, the weight body includes a circumferential groove in an inner surface formed by the bore, and a snap ring extends into the circumferential groove of the locking member and the circumferential groove of the weight body so that the locking member is rotatably coupled to the weight body in the bore.

In an additional non-limiting embodiment of the present technology the at least one roller is a ball.

In an additional non-limiting embodiment of the present technology the spring clip is biased toward the center of the weight member.

In an additional non-limiting embodiment of the present technology the first flange of the weight body is annular, the second flange of the weight body is annular, and the clip portion of the weight body is annular.

In an additional non-limiting embodiment of the present technology the weight member further comprises a compressible gasket disposed on the first flange.

In an additional non-limiting embodiment of the present technology the cam surface of the locking member includes at least one detent and at least one ramp, wherein the locking member has a minimum outer dimension on the at least one detent and a maximum outer dimension on the at least one ramp.

An additional non-limiting embodiment of the present technology includes a weighted grip assembly comprising an elongate grip body and a weight member. The elongate grip body defines a butt end and includes a weight mount disposed in the butt end. The weight mount includes an aperture defined by an outer surface of the grip body and defines an undercut adjacent the aperture. The weight member comprises a weight body, a spring clip, and a locking mechanism. The weight body includes a first flange that is spaced from a second flange by a clip portion and defines a bore that extends through the first flange and at least a portion of the clip portion. The clip portion defines at least one aperture extending radially through the clip portion. The spring clip is disposed on the clip portion. The locking mechanism includes a locking member and at least one roller. The at least one roller is disposed in the at least one aperture in the clip portion and abuts a cam surface of the locking member and an inner surface of the spring clip. The cam surface of the locking member has an outer dimension that is different at different locations around the locking member. The locking member is rotatably coupled to the weight body. In a first configuration of the weight member the locking member is oriented so that the at least one roller is aligned with a first portion of the cam surface and the spring clip forcibly abuts the at least one roller. In a second configuration of the weight member the locking member is oriented so that the at least one roller is aligned with a second portion of the cam surface and forcibly abuts the spring clip to force the spring clip outward and away from the clip portion of the weight body and into the undercut.

In an additional non-limiting embodiment of the present technology the weight mount includes a tapered flange and the spring clip abuts the tapered flange when the weight member is in the second configuration.

DETAILED DESCRIPTION

Figure 1:
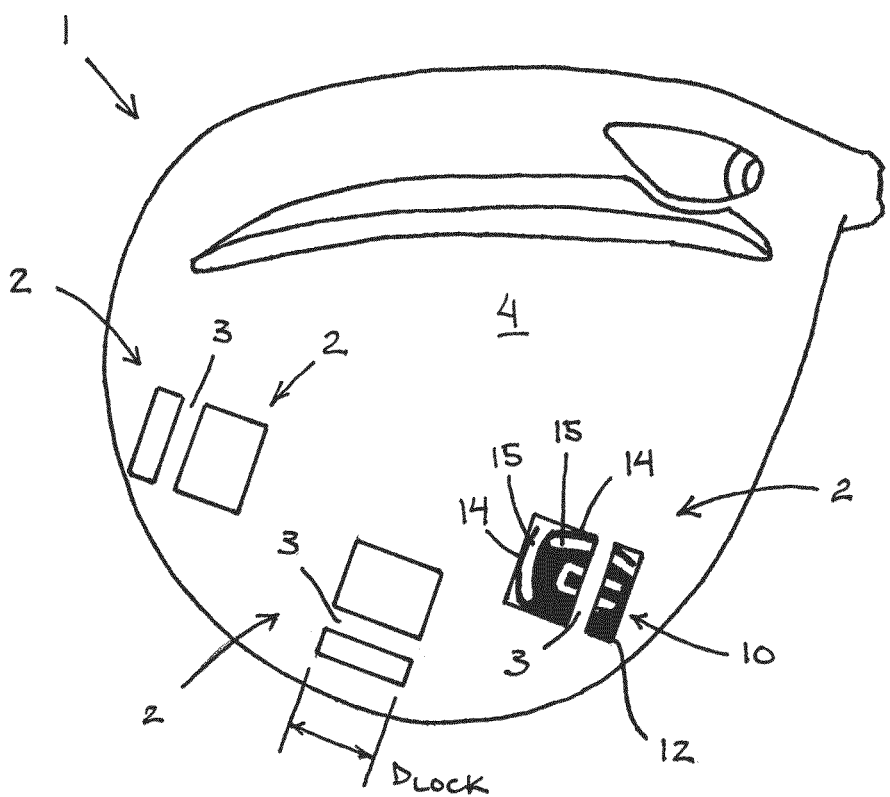
FIG. 1 is a bottom view of a golf club head including a weight member in accordance with the present invention.
Figure 3:
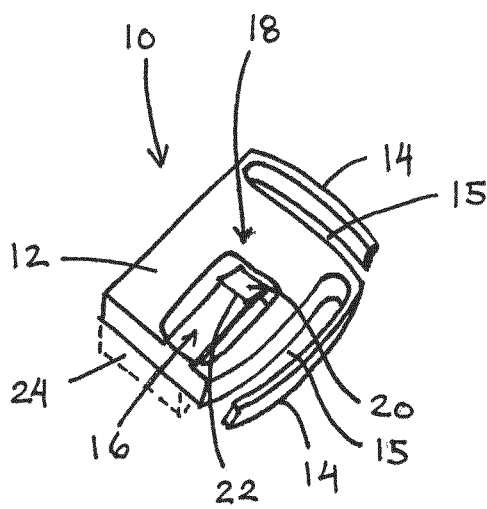
FIG. 3 is a perspective view of the weight member included in the golf club head of FIG. 1.
Figure 2:
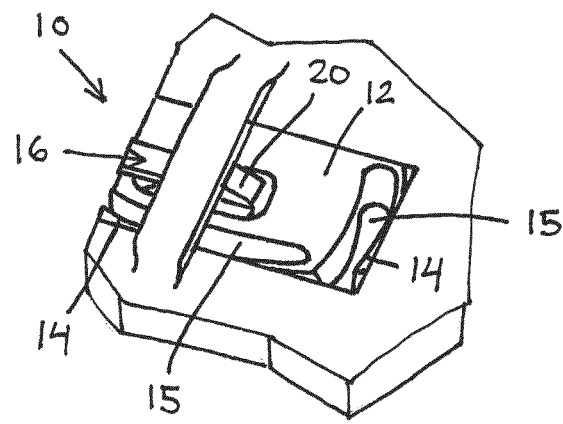
FIG. 2 is a perspective view of a portion of a golf club head of FIG. 1.

Other than in the operating examples, or unless otherwise expressly specified, all of the numerical ranges, amounts, values and percentages such as those for amounts of materials, moments of inertias, center of gravity locations, loft and draft angles, and others in the following portion of the specification may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

Many weight structures utilize attachment mechanisms that primarily utilize a force in the direction of an axis that is orthogonal to the outer contour of the golf club head for attaching weight member to the golf club head. According to the present invention, weight members that primarily utilize forces that are generally directed parallel or tangential to the outer contour of the golf club head and lateral to the weight member are described. Utilizing attachment configurations that primarily interact with the surrounding structure of the golf club head in parallel or tangentially to the outer contour of the golf club head reduces the amount of structure that extends toward the interior of the golf club head that would otherwise be required to retain the weight member.

In an aspect of the present invention, an embodiment of a weight member 10, having a low profile, includes a simple clip-in type attachment that does not require the use of a threaded fastener to couple the weight member 10 to the golf club head 1. Golf club head 1 has a hollow bodied construction that includes a face, a sole 4, a crown, a skirt, and a hosel that combine to define the hollow interior. As is well known in the art, the body may be formed by numerous methods and those methods may be used alone or in combination, and the club head body may include cast, stamped and/or forged components that are combined together. In an example, the head body may include a cast component including the sole, crown, skirt and hosel and a stamped face component that is welded to the cast component. In another example, the head body may include forged sole, crown, hosel, and face components that are welded together.

The face defines a ball-striking surface. The sole 4 extends aftward from a lower edge of the face. The crown extends from an upper edge of the face and the skirt extends between the sole 4 and crown and around the perimeter of the body. Golf club head 1 also includes a plurality of weight attachment structures, such as weight mounts 2. Weight member 10 includes a body 12, and three spring features. The spring features include two side wall spring features that are flexible arms 14 and a locking spring feature formed by a flexible locking arm 16 on another surface. Each flexible arm 14 is defined by an elongate aperture 15 that extends through the thickness of body 12 and that intersects the side wall of body 12.

The side wall spring features and locking arm 16 combine to prevent relative movement between the weight cartridge and the golf club head in three orthogonal axes, e.g., the X, Y and Z axes, so that the weight member is fully constrained from translation when the weight member is installed in a weight receptacle. In particular, the dimensions of the weight mount 2 are selected so that the portions abutting the flexible arms are narrower than the free width of the weight member at the flexible arms. As a result of those dimensions, the flexible arms 14 and locking arm 16 are at least partially flexed laterally and act upon the surrounding structure of the weight mount 2 and are compressed to exert lateral force on the surrounding structure to prevent translation of the weight member 10 in every direction, i.e., in three orthogonal axes.

The weight member 10 also includes a locking mechanism that selectively locks the weight member 10 into the golf club head 1 at one of the weight mount 2. The locking arm 16 may include a locking tooth 18 that prevents the weight member 10 from becoming dislodged and disengaging from the golf club head 1 during impact. In the illustrated embodiment, the locking arm 16 interacts with a locking feature on the weight mount 2, such as a bridge member 3 that forms an undercut portion in weight mount 2. Bridge member 3 extends across a portion of the weight member 10 when the weight member 10 is inserted into a weight mount 2. Locking tooth 18 includes a tapered surface 20 that abuts and slides past bridge member 3 when the weight member 10 is inserted into a weight mount 2. That contact forces locking arm 16 to flex so that the locking tooth 18 slips past bridge member 3, which allows the weight member 10 to be fully inserted into the weight mount 2. Bridge member 3 may also include a tapered abutment surface that gradually increases contact force between tooth 18 and bridge member 3. The weight member 10 and weight mount 2 are dimensioned so that when the weight member 10 is fully inserted, the tapered surface 20 of locking tooth 18 passes the contacting portion of bridge member 3 and a ledge 22 of locking tooth 18 engages a portion of bridge member 3. The engagement of the ledge 22 and bridge member 3 prevents the weight member 10 from disengaging the weight mount 2, but the weight member 10 may be removed by displacing locking tooth 18 relative to bridge member 3 so that the locking tooth 18 is able to slip past bridge member 3 to allow weight member 10 to be retracted from weight mount 2. It should be appreciated that the height of flexible arms 14 may differ from the overall thickness of the weight member 10. For example, an extension portion, shown by dashed portion 24, may be included to increase the volume of weight member 10. Additionally, ledge 22 may be replaced with a second tapered surface that allows the weight member 10 to be removed without separately flexing locking arm 16 to disengage the locking tooth 18 from bridge member 3. The taper of the second tapered surface is preferably steeper than tapered surface 20.

Figure 4:
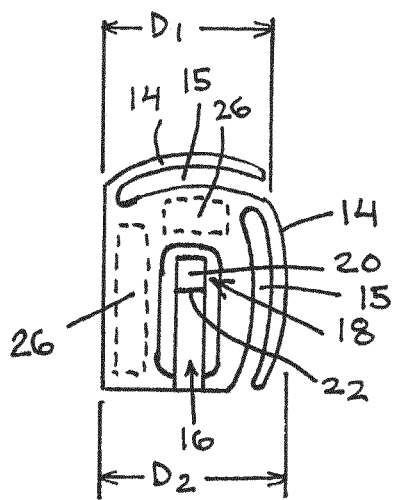
FIG. 4 is a front view of the weight member that may be included in the golf club head of FIG. 1.
Figure 5:
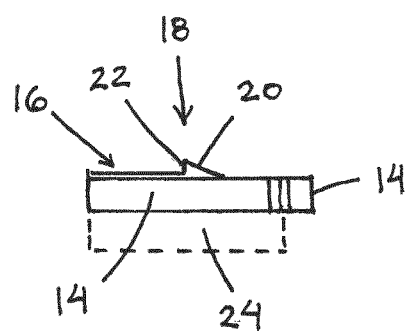
FIG. 5 is a side view of the weight member of FIG. 4.
Figure 6:
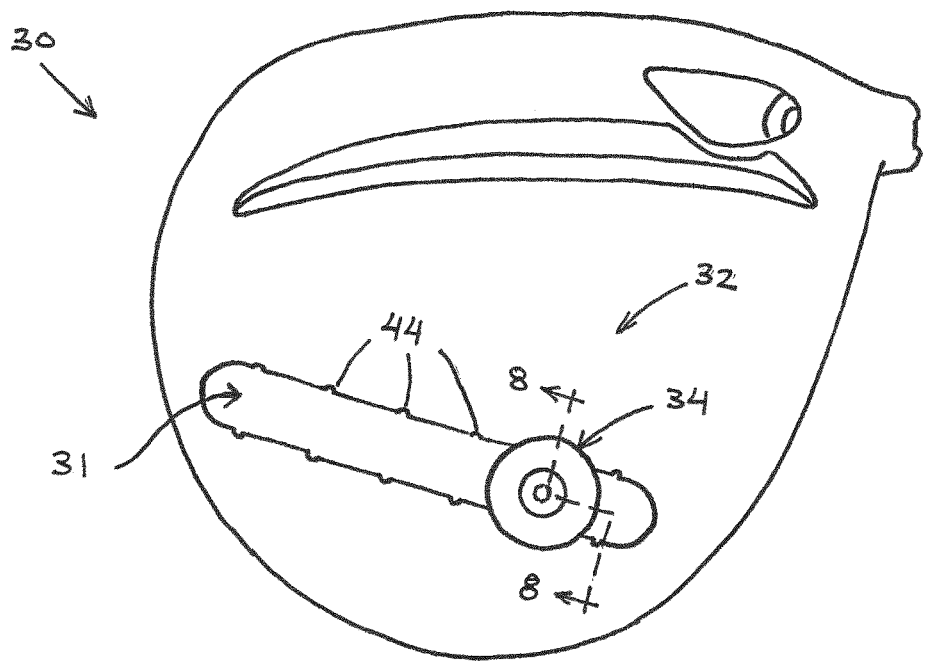
FIG. 6 is a bottom view of a golf club including another weight member in accordance with the present invention.
Figure 7:
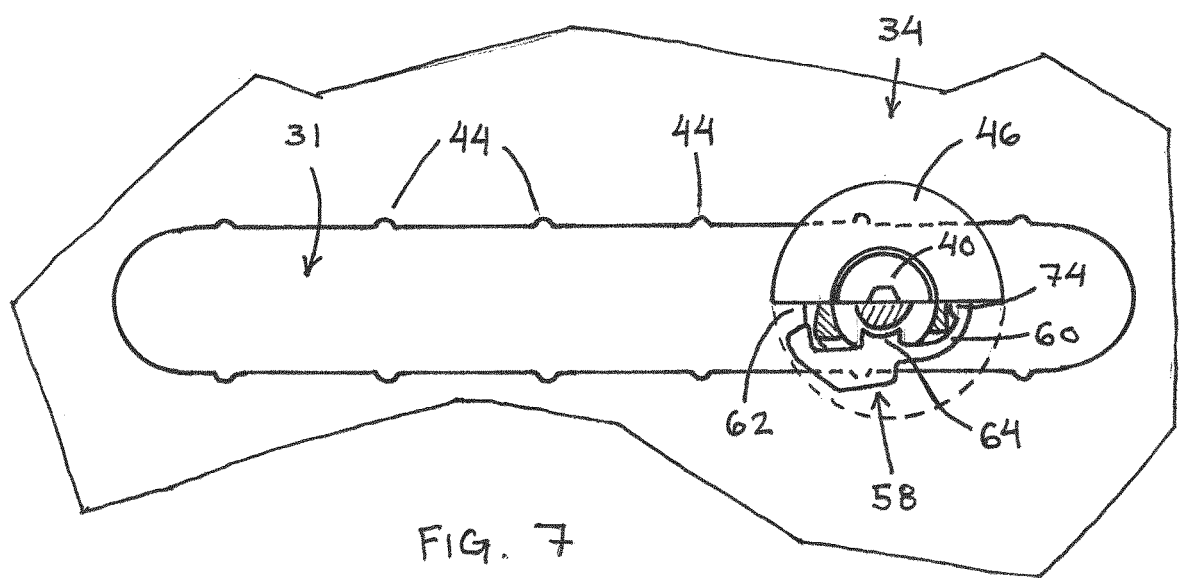
FIG. 7 is a bottom view of a portion of the golf club head of FIG. 6.
Figure 8:
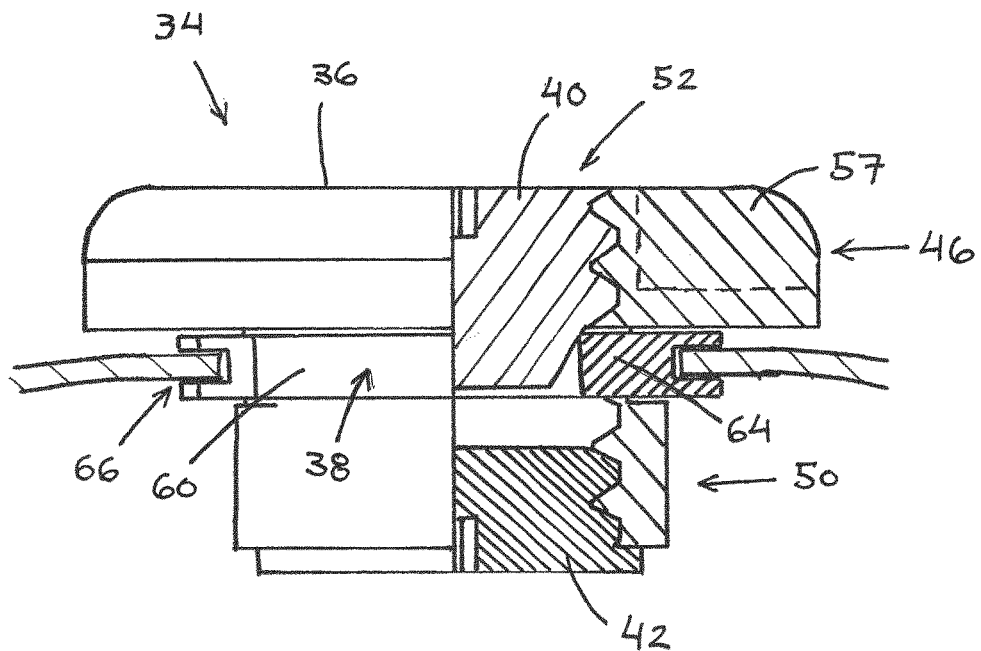
FIG. 8 is a partial cross-section of the golf club head of FIG. 6, as shown by line 8-8.
Figure 9:
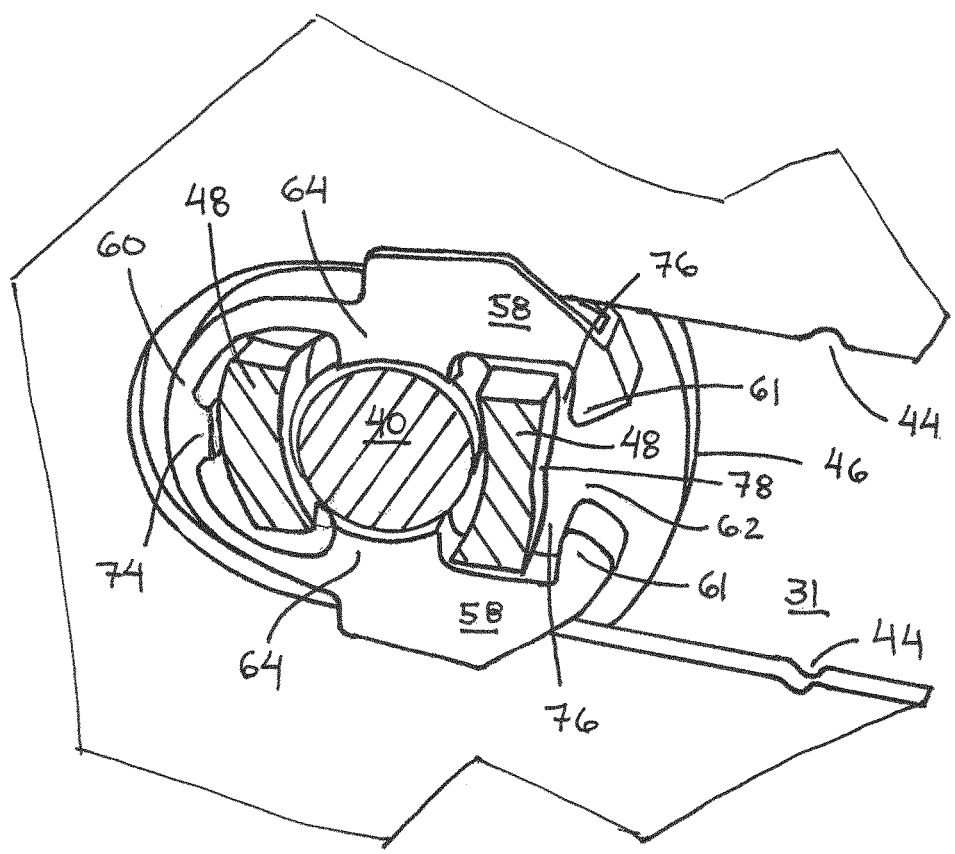
FIG. 9 is a perspective view showing a partial cross-section of a portion of the golf club head of FIG. 6.
Figure 10:
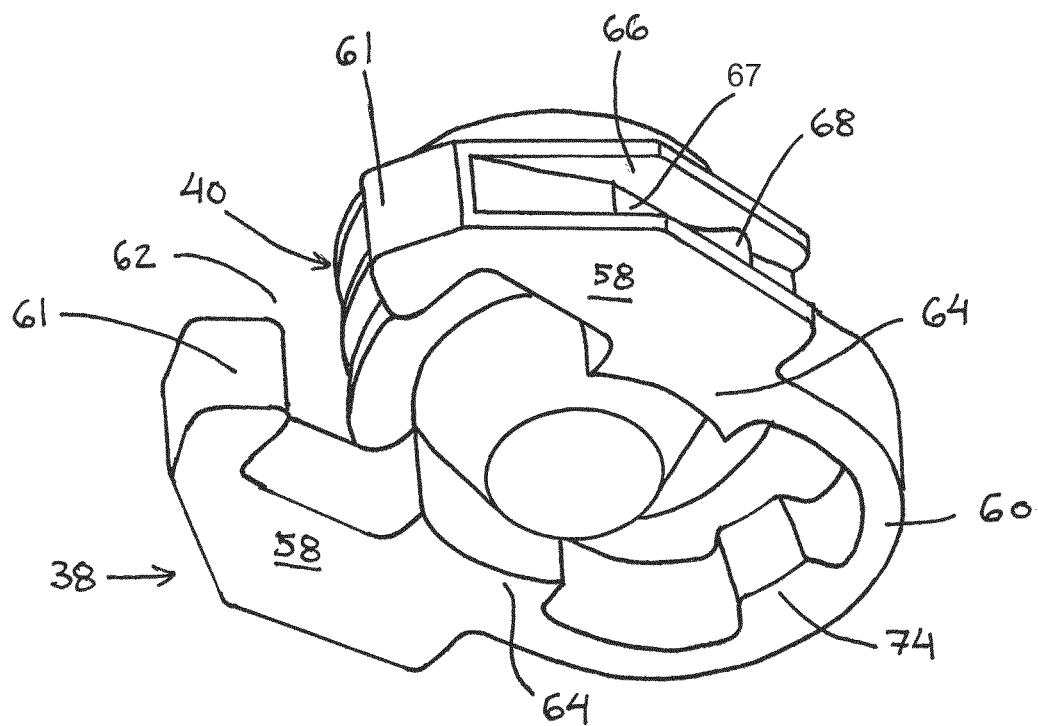
FIG. 10 is a perspective view of a portion of the weight member included in the golf club head of FIG. 6.
Figure 11:
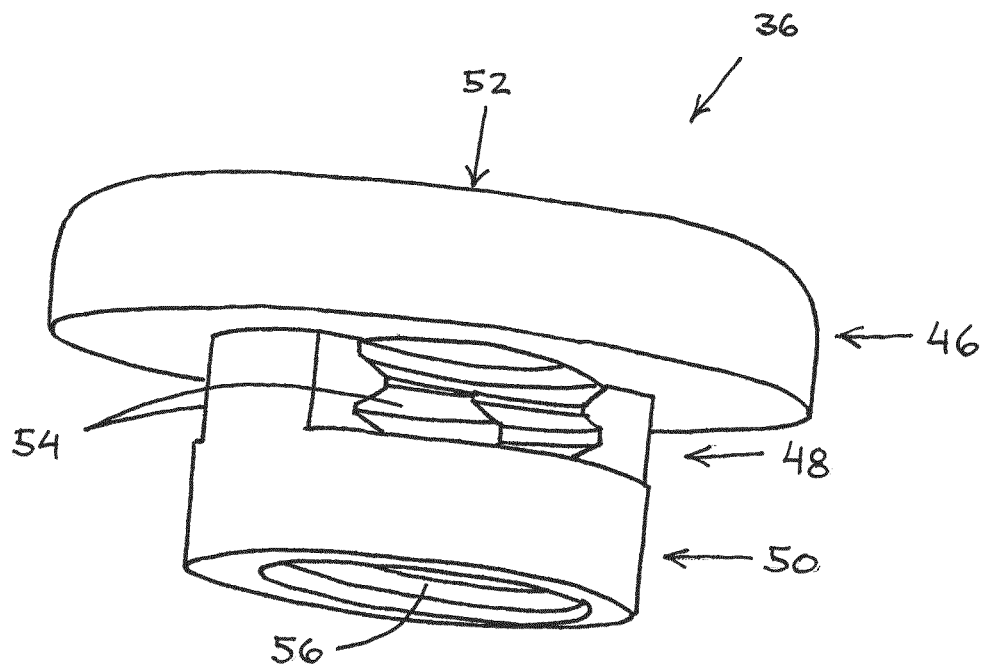
FIG. 11 is a perspective view of a portion of the weight member included in the golf club head of FIG. 6.
Figure 12:
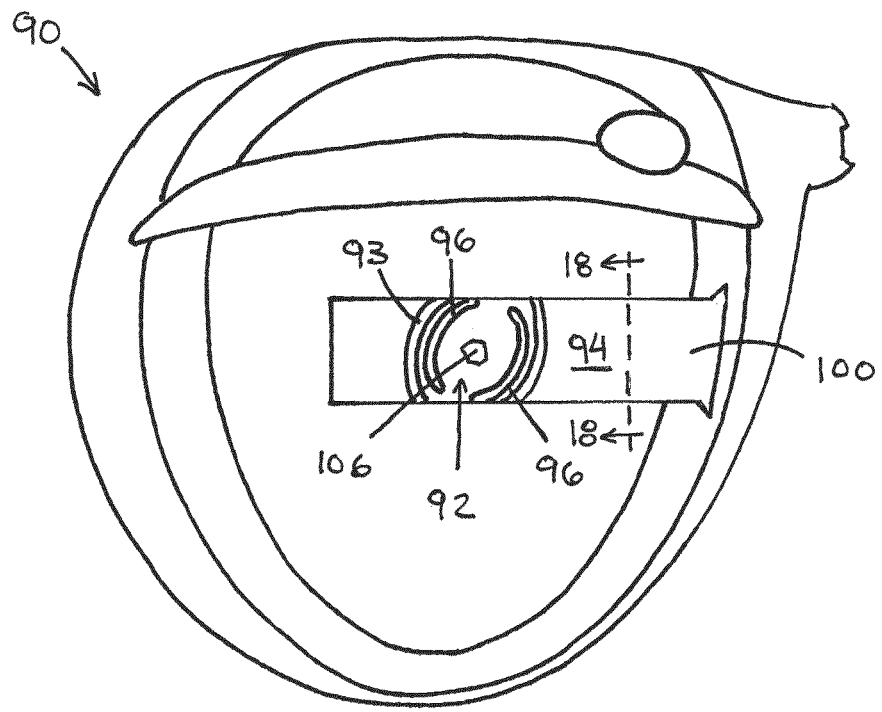
FIG. 12 is a bottom view of a golf club including another weight in accordance with the present invention.
Figure 13:
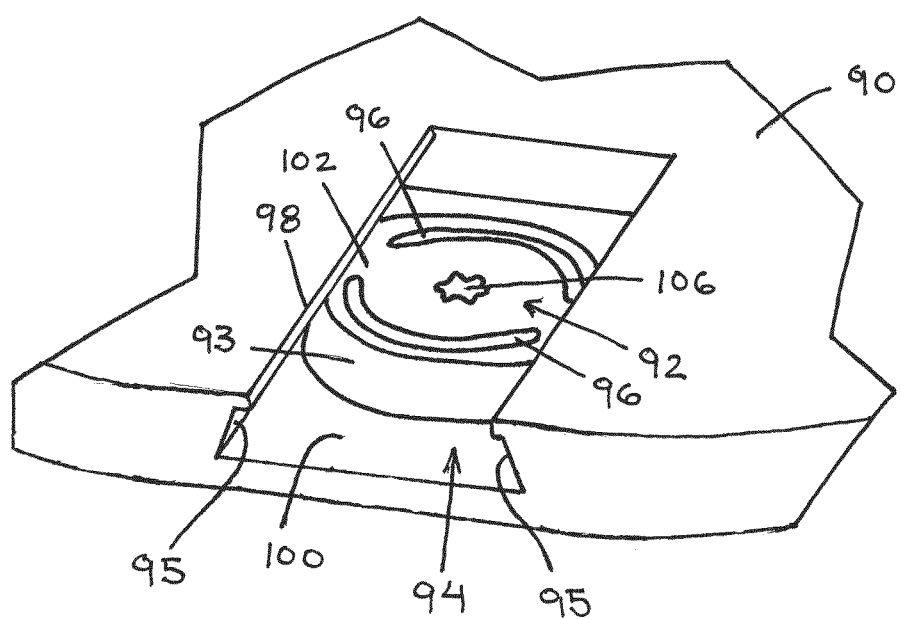
FIG. 13 is a perspective view of a portion of the golf club head of FIG. 12.
Figure 14:
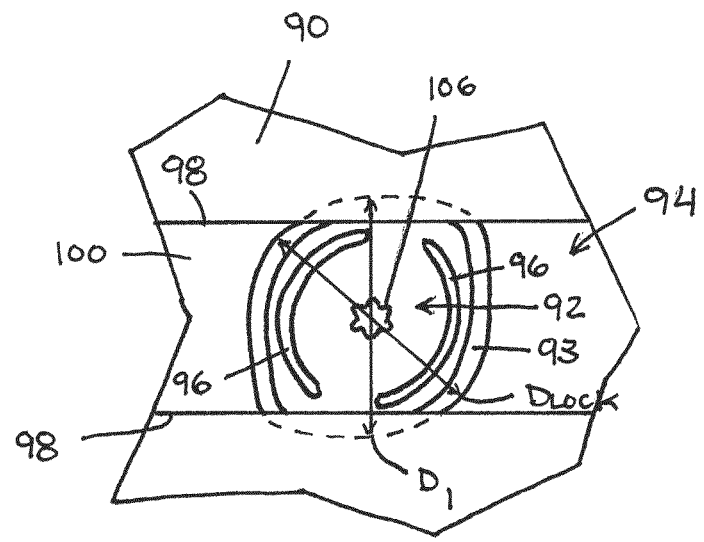
FIG. 14 is a bottom view of a portion of the golf club head of FIG. 12, illustrating a weight member in an unlocked orientation.
Figure 15:
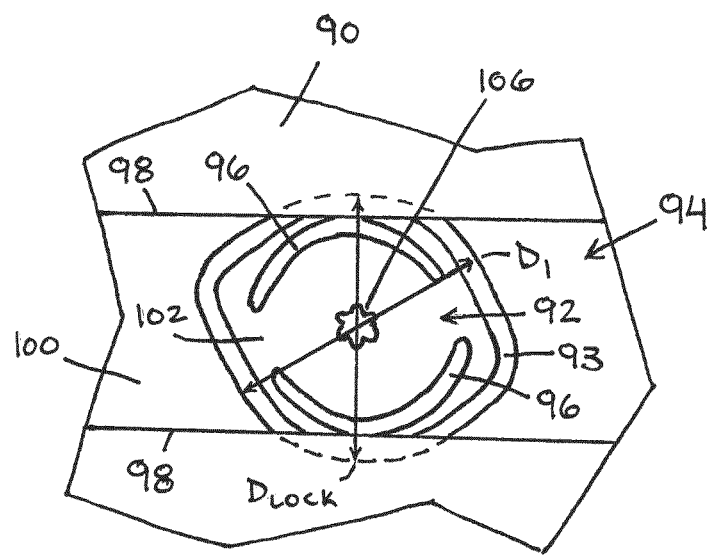
FIG. 15 is a bottom view of a portion of the golf club head of FIG. 12, illustrating a weight member in a locked orientation.
Figure 16:
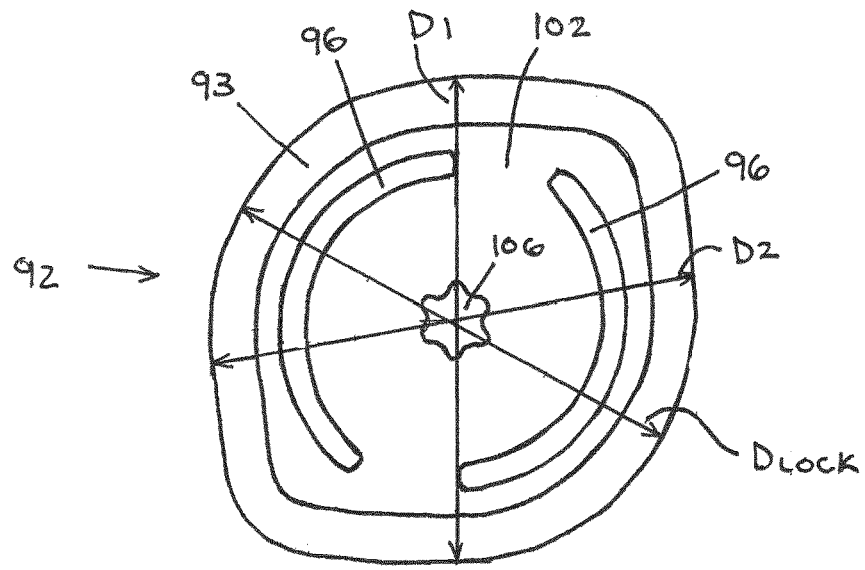
FIG. 16 is a bottom view of the weight member included in the golf club head of FIG. 12.
Figure 17:
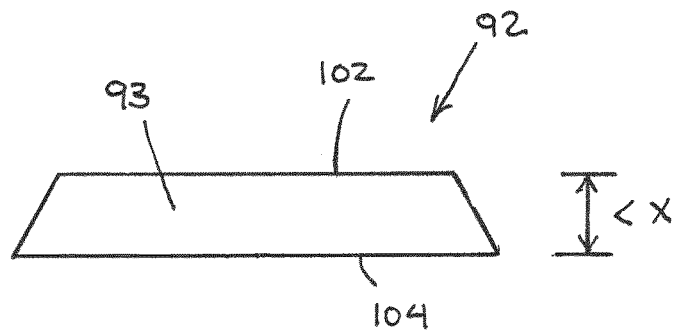
FIG. 17 is a side view of the weight member included in the golf club head of FIG. 12.
Figure 18:
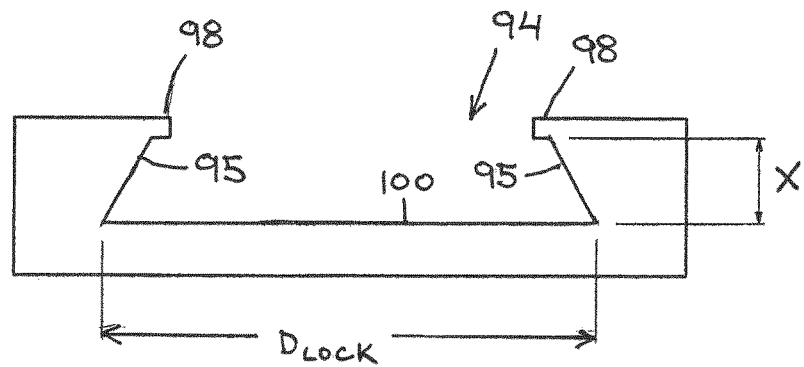
FIG. 18 is a cross-sectional view of the weight track of FIG. 12, taken along line 18-18.

Weight member 10 may be constructed from a single material or it may have a multi-material construction. For example, as shown in FIG. 4, portions of the weight body 12, shown by dashed portions 26, may include recesses or may be constructed of a material having a different specific gravity than the remainder of the weight body to create an insert that is heavier or lighter relative to the weight body. In embodiments having a heavy or light insert, the insert may be joined with the weight body by many different methods, including mechanically fixing the insert to the weight body by threaded engagement, and/or fasteners. Alternatively, the materials may be coupled using metallurgical joining techniques, such as welding, swaging, forging the materials together, or co-casting.

Referring to FIGS. 6-11, a golf club head 30 includes another weight system 32 that provides adjustability of the center of gravity of the golf club head and that is disposed on a body member. The weight system 32 includes weight member 34 and a weight mount in the form of slot 31 extending through at least a portion of the thickness of the body member. Weight member 34 is assembled from a weight body 36, a spring clip 38, a locking member 40, and an optional weight slug 42. Weight member 34 is installed in slot 31, slides along edges of slot 31, and is configured to naturally seat in detent recesses 44 that are included in the edges of slot 31. Preferably, weight member 34 provides an audible and/or tactile "click" when it seats in each of the detent recesses 44 included in slot 31.

Weight body 36 provides the primary source for mass in weight member 34, while providing a frame for supporting spring clip 38. In particular, the weight body 36 includes an outer portion 46 that resides outside of slot 31 when weight member 34 is installed, a clip portion 48 that receives spring clip 38 and resides in slot 31 when weight member 34 is installed, and an inner portion 50 that is sized to extend through slot 31. In the illustrated embodiment, outer portion 46 is a generally cylindrical portion of the weight body 36. Preferably, the outer portion has an outer dimension that prevents it from being inserted into slot 31, so that it limits the insertion of the weight body 36 into slot 31. It should be appreciated that the outer portion 46 need not be cylindrical, and the shape and size of the outer portion 46 may be altered to alter the overall mass of the weight body 36 and weight member 34. Outer portion 46 also includes a locking member mount 52, such as a bore that receives locking member 40 and that extends into clip portion 48. For example, locking member mount 52 may be a threaded bore that threads with a locking member 40 that includes a threaded portion. As a further alternative, outer portion 46 may have a multi-material construction so that the mass of weight body 36 may be altered, such as by replacing a portion of the outer portion 46 indicated by dashed area 57 with a component constructed of a material having a different specific gravity than the material of weight body 36.

The clip portion 48 and inner portion 50 extend from outer portion 46. Clip portion 48 is interposed between outer portion 46 and inner portion 50 of weight body 36 and provides a mounting structure for spring clip 38 on weight body 36. In particular, clip portion 48 includes slots 54 on opposite sides of the weight body 36. Spring clip 38 is disposed on weight body in clip portion 48 so that a portion spring clip 38 resides in slots 54. The configuration of slots 54 results in outer portion 46 and inner portion 50 creating shoulders that straddle spring clip 38 and retain it in the direction of a longitudinal axis of weight body 36. Slots 54 extend through the side wall of the clip portion 48 so that a portion of the spring clip 38 intersects the bore that forms the locking member mount 52 when spring clip 38 is installed on weight body 36.

Inner portion 50 extends away from outer portion 46 and clip portion 48 and is sized so that it may extend through slot 31. In the illustrated embodiment, inner portion 50 is generally an annular cylindrical body that has an outer diameter that is smaller than the width of the opening of slot 31. It should be appreciated that inner portion 50 may include parts that have an outer dimension that is greater than the opening of slot 31, as long as some part of inner portion 50 has an outer dimension that allows it to be inserted into a portion of slot 31. It should also be appreciated that inner portion 50 need not be cylindrical, but may alternatively have a polygonal shape, such as a square or rectangle, or another curved shape. Inner portion 50 may also include a mounting feature for weight slug 42, which may be used to increase the mass of weight member 34. For example, inner portion 50 may include a mount 56 that allows a selected weight slug 42 to be coupled to weight body 36. Mount 56 may be a threaded bore and weight slug 42 may be a threaded weight member that is selected from a plurality of weight slugs 42 having different masses and threaded into mount 56.

Spring clip 38 generally includes two arms 58 that are able to flex toward and away from each other. The arms 58 are coupled by a flexure 60 and terminate at terminal ends 61 that are spaced from each other to define a gap 62. Spring clip 38 also includes locking tabs 64 that extend inward from arms 58. Locking tabs 64 extend through the side wall of clip portion 48 so that they intersect a portion of the bore that forms locking member mount 52.

Each of arms 58 defines an outer channel 66, that is at least partially defined by an outer engagement surface 67, and that receives a portion of the side wall of slot 31. A detent projection 68 is disposed in each outer channel 66 that is shaped and sized to complement the shape and size of the detent recesses 44 included in slot 31. The detent projection 68 is a portion of outer engagement surface 67 that locally extends outward. Spring clip 38 and slot 31 are shaped so that spring clip 38 is biased radially outward when it is installed in slot 31. As a result, spring clip 38 remains in contact with the edges of slot 31 and creates the force that causes the detent projections 68 to click into the detent recesses 44.

The sizes of the channels 66 and detent projections 68 are selected so that there is minimal clearance between those features and the complementary portions of the slot 31. That minimal clearance allows the weight member 34 to move along slot 31 while preventing additional movement relative to the walls of slot 31. As a further alternative, the edges of slot 31, including detent recesses 44 may be beveled, and the detent projections 68 may be tapered so that when the projections engage the recesses, the weight member 34 is drawn further into slot 31 and against the wall of golf club head 30. Spring clip 38 is constructed so that arms 58 may be spread apart from one another so that clip portion 48 of weight body 36 may be inserted through gap 62 and locking tabs 64 located in slots 54.

Locking member 40 is included to selectively provide support to spring clip 38 to limit inward motion of the locking tabs 64 when the weight member 34 is positioned at a detent location. Locking member 40 is a tapered screw that includes a threaded portion 70 and a tapered tip portion 72. Threaded portion 70 couples with the threaded bore included in outer portion 46 of weight body 36 and allows a user to rotate the locking member relative to the weight body to advance and retract locking member 40 relative to weight body 36. The tapered tip portion 72 extends into clip portion 48 of weight body 36 and is configured to selectively abut an inner surface of locking tabs 64, thereby preventing arms 58 of spring clip 38 from flexing inward toward each other when the weight member 34 is located at a detent. Locking member 40 may also be used to increase the force between the spring clip 38 and the walls of slot 31 by advancing the locking member 40 further into weight body 36 after contact is established between locking tabs 64 and the tapered tip portion 72. Preferably, the locking member 40 is dimensioned so that it requires between ¼ and ½ of a turn of the locking member to disengage the spring clip 38 enough to allow the weight member 34 to slide along slot 31.

In general, the weight member 34 is slid in slot 31 by a user grasping outer portion 46 of weight body 36 and sliding the weight member 34. However, because spring clip 38 is configured to slide against the walls of slot 31 the spring clip 38 may shift in clip portion 48 relative to weight body 36. That shift may cause the spring clip 38 to interact with the side walls of clip portion 48 and locking member 40 which can cause the arms 58 of spring clip 38 to be pushed outward, or spring clip 38 to twist relative to slot 31, thereby increasing the friction between the spring clip 38 and the slot wall and further hindering the ability to slide the weight member in slot 31. Accordingly, features that prevent the relative motion between the spring clip 38 and the other components, and/or features that prevent the arms 58 of spring clip 38 from spreading due to the relative motion are included in the construction of weight member 34. For example, spring clip 38 may include a spacer 74 that is incorporated into flexure 60 that limits both the space between spring clip 38 and clip portion 48 of weight body 36 and the relative motion between the two components. Additionally, spring clip 38 may be shaped to limit a gap 76 between clip portion 48 and the terminal ends 61 of arms 58, and the surface of clip portion 48 closest to terminal ends 61 may include a concavity 78 so that contact between concavity 78 and terminal ends 61 draws arms 58 together. Still further, the width of locking tabs 64 may be selected to closely clear the width of the portions of slots 54 that receive tabs 64 so that the amount of clearance between the locking tabs 64 and slots 54 dictates the range of motion of the spring clip 38 relative to the weight body 36.

In general, slot 31 is only required to be an elongate opening in a wall of the golf club head that includes detent features to interact with weight member 34. It is generally desirable to close the slot so that the interior of the golf club head is not exposed, so a slot cover may be installed to close the interior volume of the golf club head. The cover may be a thin-walled trough or tray that may be glued inside the golf club head to cover the slot and to seal the inner cavity of the golf club head from air, water or other debris.

In another embodiment, shown in FIGS. 12-18, a golf club head 90 includes a weight member 92 that utilizes spring features and a cam shape to lock the weight member 92 into a desired location in a weight mount that is formed by a shallow track 94. The weight member 92 may be rotated in the track 94 between a first, unlocked orientation, shown in FIG. 14, in which a side wall 93 of the weight member 92 is spaced from the side wall of the track 94, and a second, locked orientation, shown in FIG. 15. When the weight member 92 is in the locked orientation, the cam shape results in the side wall 93 of the weight member 92 abutting the side wall 95 of the track 94 and creating an outward, lateral force between track 94 and weight member 92.

Weight member 92 is generally a monolithic weight body that is shaped so that it functions as a cam in track 94, and includes an outer surface 102, an inner surface 104, and side wall 93 extends between outer surface 102 and inner surface 104. In particular, the side wall 93 of weight member 92 is curved and non-circular so that the outer dimension varies with the angular orientation of the weight member 92. In an example, weight member 92 has an oculiform shape, i.e., is shaped like an eye, so that the overall outer dimension taken through a centroid of the weight member varies between a minimum overall outer dimension D1 of 28.5 mm and a maximum overall outer dimension D2 of 30.0 mm. The side wall 93 of the weight member 92 is beveled at an angle in a range of 20° to 40°, and more preferably at an angle of about 30° and the weight member 92 has a thickness of about 4.8 mm. Weight member 92 also includes slots 96 that are generally semi-circular elongate apertures spaced from the side wall 93 so that the side wall 93 forms a spring feature. Preferably, the slot has a width of between about 1.5 mm and about 3.0 mm, and is spaced from the side wall 93 by a distance of about 1.5 mm at outer surface 102 of weight member 92.

Track 94 is generally formed by angled, or beveled, side walls 95 that form undercuts on the sides of the weight mount. The side walls 95 of the track 94, which are preferably parallel to the side wall 93 of weight member 92, are beveled at an angle about equal to the angle of the side wall of the weight member, in particular at an angle of about 30° relative to a bottom wall support surface 100 of track 94. The contact between the beveled side walls during rotation of the weight member 92 relative to track 94 causes weight member 92 to be drawn into the track 94 so that inner surface 104 is forced against support surface 100 of track. The outermost edges of track 94 include ledges 98 that form overhanging shoulders that are spaced from support surface 100 of track 94 by a distance that is greater than the thickness of weight member 92 to provide a gap so that weight member 92 may slide in track 94. Preferably, the distance is greater than the thickness of weight member 92 by about 0.01 inch to about 0.05 inch. The width of the track is selected to allow both locking and sliding of the weight member 92. In particular, the width of the track 94 at each elevation above the support surface 100 is selected to be between a minimum and a maximum outer dimension of the weight member at each corresponding elevation from support surface 100. Additionally, support surface 100 has a value DLock that is between the minimum overall outer dimension D1 and the maximum overall outer dimension D2 of inner surface 104 of weight member 92 so that the weight member may be locked in place by rotation and cam action.

A tool engagement feature 106 is included in the body of weight member 92 for locking weight member 92 in track. In particular, tool engagement feature 106 is a feature that receives a portion of a tool, such as a screw driver or torque wrench, so that the tool may be used to rotate weight member 92 in track 94.

Figure 19:
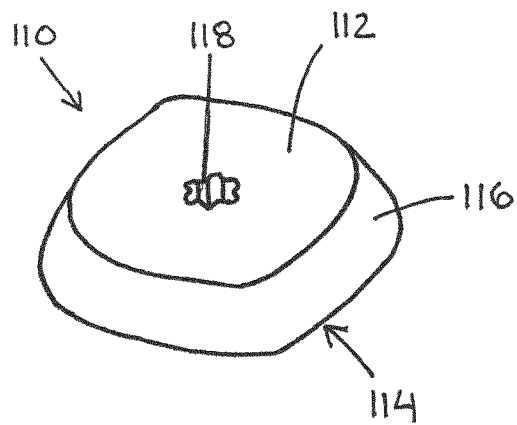
FIG. 19 is a perspective view of an alternative embodiment of the weight of FIG. 17.

Alternative embodiments of a weight member utilizing a cam shape to lock the weight member in place in a shallow track are illustrated in FIGS. 19-22, all of which may have a generally oculiform shape. Referring to FIG. 19, a weight member 110 is similar to the weight member of FIGS. 12-17, but does not include the spring features formed by slots. Weight member 110 generally includes an outer surface 112, an inner surface 114, a side wall 116, and a tool engagement feature 118. Weight member 110 is shaped to cam against walls of a weight track having beveled side walls, such as weight track 94. The side wall 116 of weight member 110 is beveled to match the side walls of a complementary track and the weight member 110 locks in the track in the same manner as weight member 92 described above.

Figure 20:
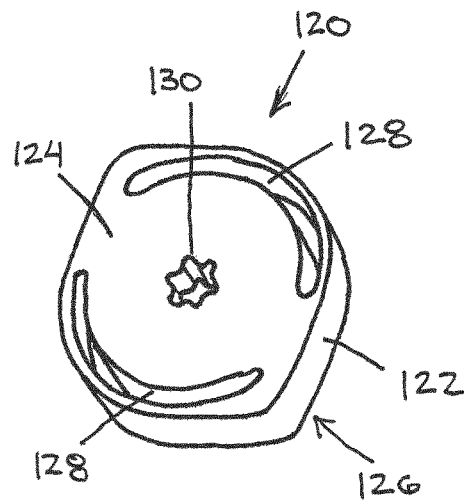
FIG. 20 is a perspective view of another alternative embodiment of the weight of FIG. 17.
Figure 21:
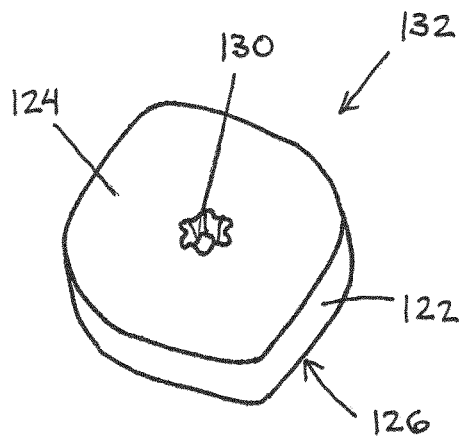
FIG. 21 is a perspective view of another alternative embodiment of the weight of FIG. 17.

Referring to FIG. 20, a weight member 120 including a square side wall 122 will be described. Weight member 120 includes side wall 122 that extends between an outer surface 124 and an inner surface 126 and is generally square in relation to those surfaces, i.e., generally extends from those surfaces at a 90° angle. The side wall of the weight member may be square or beveled. Generally, a square side wall provides only lateral locking force, while a beveled side wall provides both vertical and lateral forces to restrict motion of the weight member relative to the track. As a result, the depth of the track may be selected to prevent relative motion of the weight member relative to the track in a direction orthogonal to the cam force especially for weights having square side walls.

Weight member 120 also includes optional spring features to further lock the weight member into place in the locked position of the cam motion. In particular, slots 128 extend through the body of weight member 120 between outer surface 124 and inner surface 126 near side wall 122. The proximity of slots 128 to side wall 122 results in a portion of the side wall 122 functioning as a spring. Similar to previous embodiments, weight member 120 includes a tool engagement feature 130. As described above, the spring features may be used to increase the cam force between the weight member and the track if needed. However, in some embodiments, that additional spring force is not required, and a weight member 132, shown in FIG. 21, has a construction identical to weight member 120 without the slots forming the spring features, and because of the otherwise identical construction it will not be described further in detail.

Figure 22:
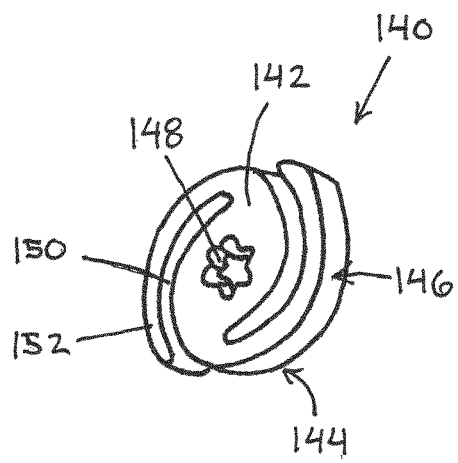
FIG. 22 is a perspective view of another alternative embodiment of the weight of FIG. 17.
Figure 23:
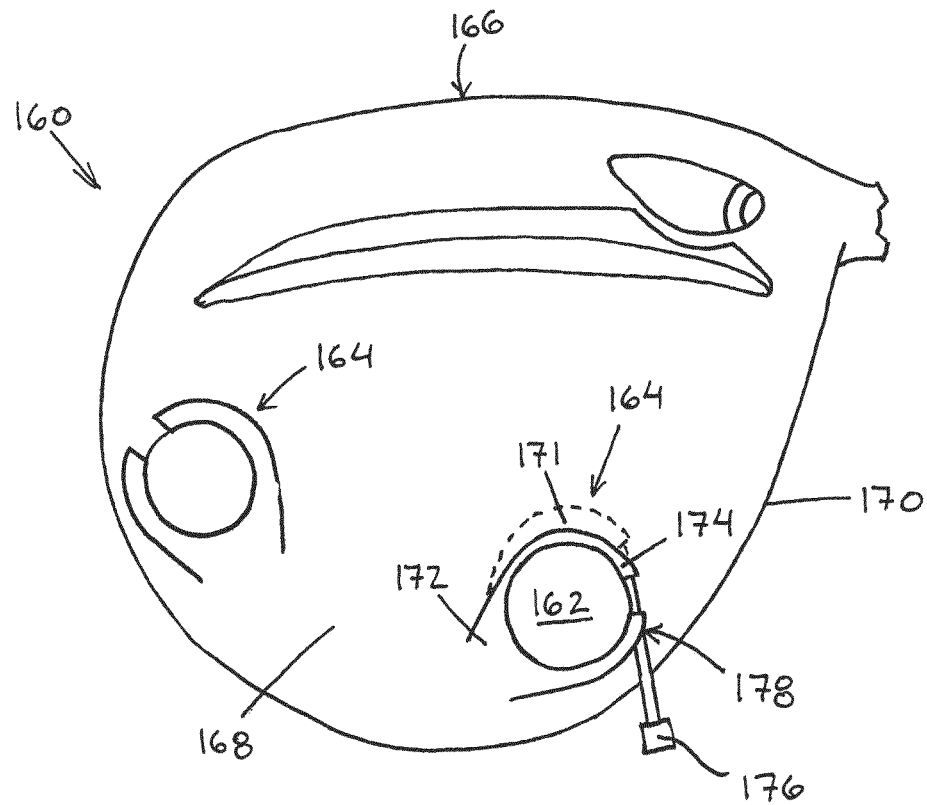
FIG. 23 is a bottom view of a golf club head including another weight member in accordance with the present invention.
Figure 24:
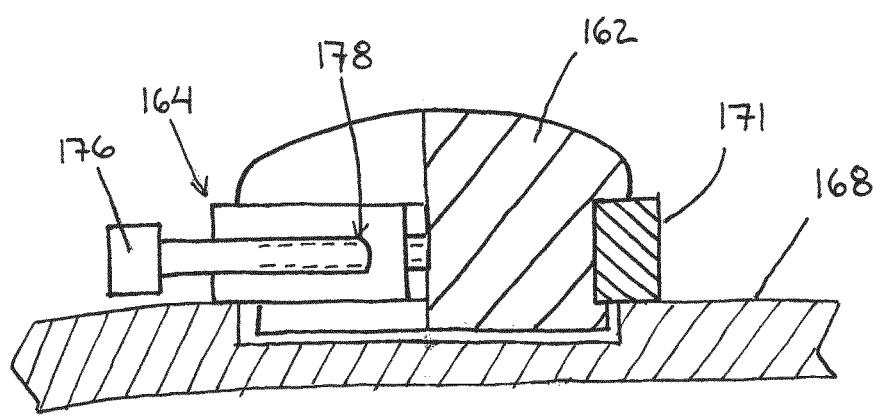
FIG. 24 is a partial cross-section view of the weight receptacle and weight member shown in FIG. 23.

In another embodiment, a weight member 140 includes an alternative construction for spring features and is illustrated in FIG. 22. Weight member 140 includes an outer surface 142, an inner surface 144, a side wall 146 and a tool engagement feature 148. The construction of weight member 140 is similar to the construction of weight member 120 with an alternative spring feature. In particular, weight member 140 includes slots 150 that intersect side wall 146, so that side wall 146 is discontinuous and so that portions of the body of weight member 140 form cantilevered arms 152 that are configured to flex and to provide spring features. All other aspects of the construction of weight member 140 are similar to those described above and will not be further described.

In another embodiment, a golf club head 160 includes a weight member 162 that is captured by a spring clamp 164 that forms a locking portion of a weight receptacle. Golf club head 160 generally is a hollow body defined by a face 166, a sole 168, a crown, and a skirt 170 that extends between the crown and sole 168, and is preferably manufactured by standard methods. The golf club head 160 includes at least one receptacle that accepts and retains the weight member 162, and preferably includes a plurality of weight receptacles.

The spring clamp 164 is configured to be in a naturally clamped configuration, which may be described as an "always-on" configuration. By activating the spring clamp 164 with a tool, the clamp opens and releases the captured weight member 162. A portion of the spring clamp 164 is fixed to a portion of the golf club head 160 and another portion of the spring clamp 164 forms a free end. The spring clamp 164 is preferably integrated into the construction of the golf club head 160, such as by casting the spring clamp 164 into the construction of the body. Alternatively, the spring clamp 164 may be constructed as a separate component and fixed on a portion of the golf club head body, such as by welding or mechanical fasteners.

The spring clamp 164 is affixed at the opening of a receptacle built into the golf club head 160 to form the locking portion of the weight receptacle. Spring clamp 164 is generally formed by at least one flexible arm 171 that includes a fixed end 172 and a free end 174. In the illustrated embodiment, the fixed end 172 is fixedly coupled to a portion of sole 168 and at least one free end 174 extends cantilevered from fixed end 172. Spring clamp 164 is configured as a C-clamp with a spring integrated into the construction of the flexible arm 171 to keep the clamp "on," or closed shut, but it should be appreciated that a separate spring may be incorporated into the spring clamp, such as by incorporating a torsion spring.

A tool 176 is used to open the clamp to permit weight member 162 to be installed in, or removed from, the receptacle. In the illustrated embodiment, tool 176 is threaded into a threaded bore 178 included at a portion of spring clamp 164 near free end 174 of flexible arm 171. An end of tool 176 extends out of threaded bore 178 and abuts free end 174 so that threading tool 176 further into the threaded bore 178 forces the flexible arm to flex outward to open the spring clamp. Unthreading and removing tool 176 from the threaded bore 178 allows the flexible arm 171 to return to its natural position, thereby returning the spring clamp to the natural clamped configuration. Although a threaded tool is illustrated, the tool may be used to open the clamp by different mechanisms. For example, the tool may be configured to act as a lever, push-action, pinch, cam, etc. Additionally, it should be appreciated that more than one arm of the spring clamp may be constructed to be flexible during use. For example, both arms of the illustrated spring clamp 164 may flex when tool 176 is threaded into the threaded bore 178.

Figure 25:
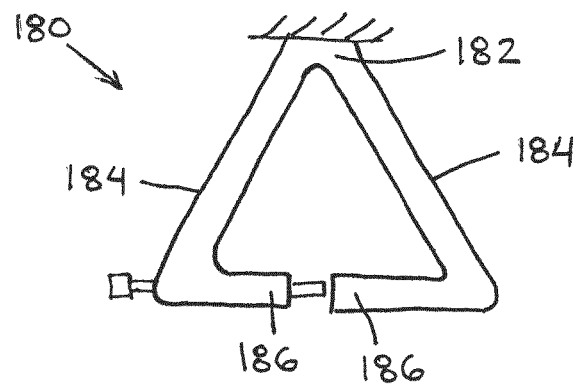
FIG. 25 is a bottom view of an alternative embodiment of the weight receptacle of FIG. 23.
Figure 26:
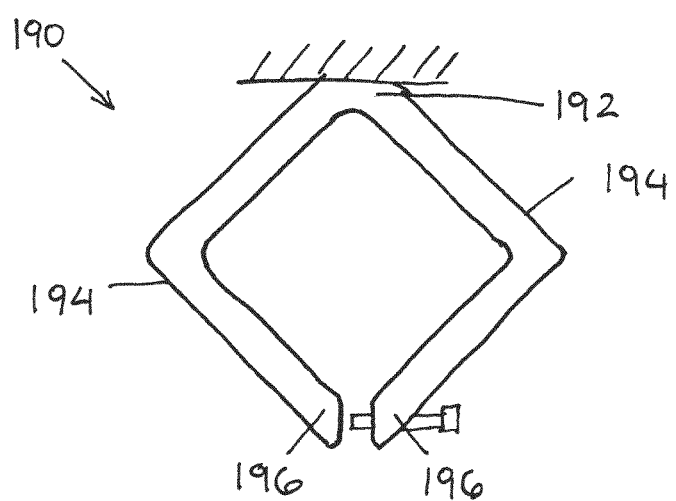
FIG. 26 is a bottom view of an alternative embodiment of the weight receptacle of FIG. 23.
Figure 27:
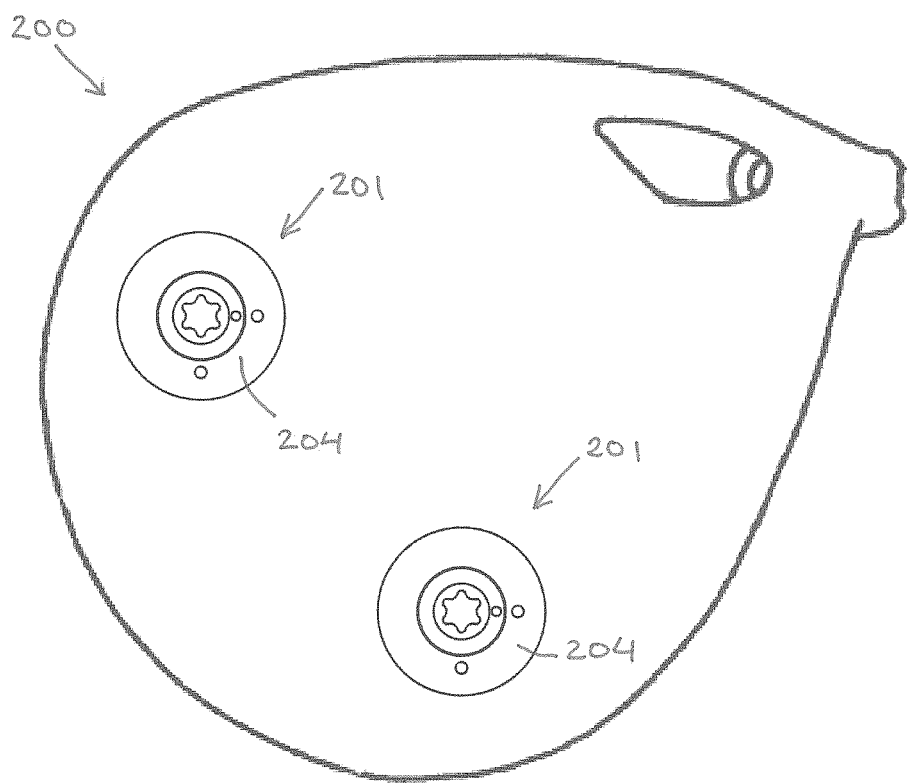
FIG. 27 is a bottom view of another embodiment of a golf club head including a weight member in accordance with the present invention.
Figure 28:
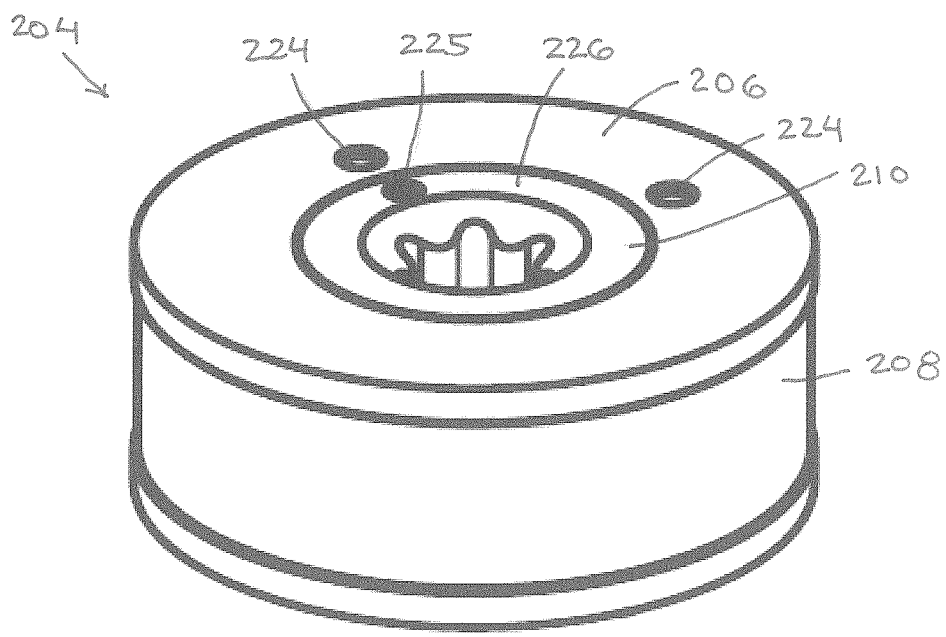
FIG. 28 is a perspective view of the weight member included in the golf club head of FIG. 27.
Figure 29:
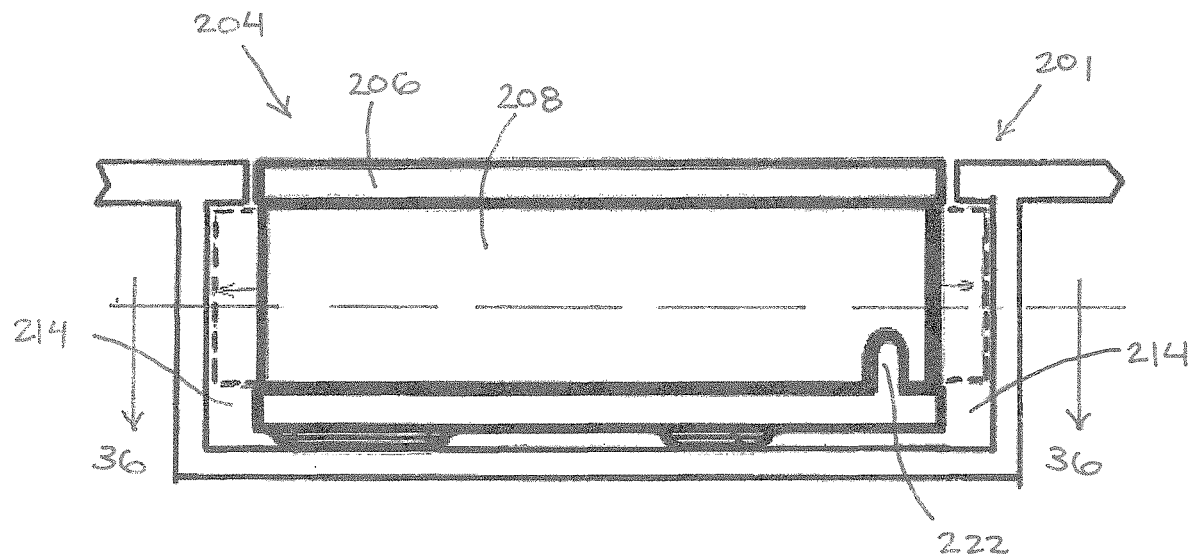
FIG. 29 is a side view of the weight member of FIG. 28.
Figure 30:
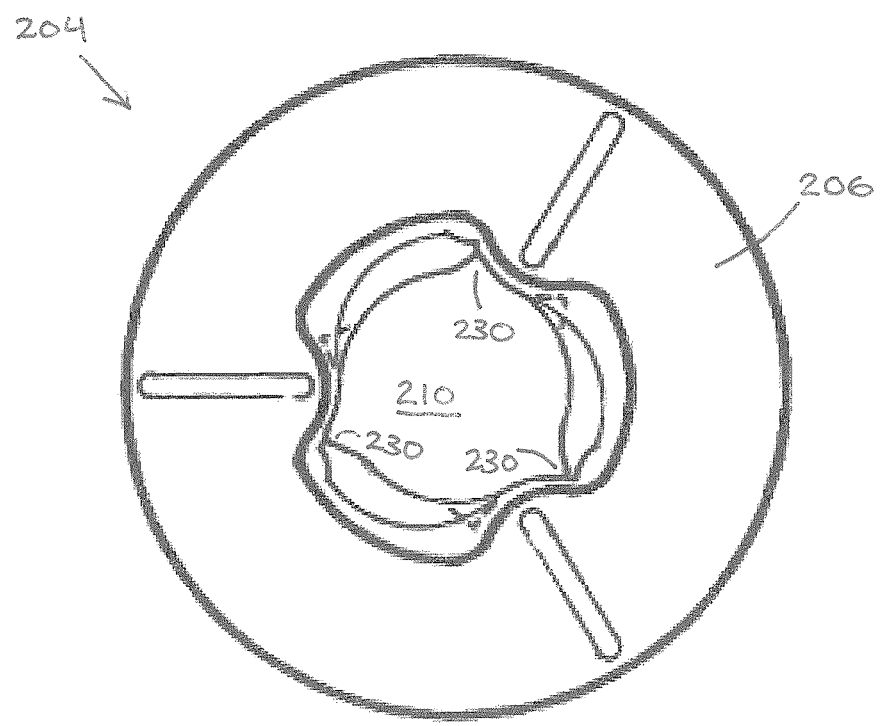
FIG. 30 is a bottom view of the weight member of FIG. 28.

Referring to FIGS. 25 and 26, the spring clamp may have many alternative shapes that provide different advantages. For example, a spring clamp may have a polygonal shape to complement a polygonal weight member and that shape prevents rotation of the weight member in the spring clamp. Referring first to FIG. 25, a spring clamp 180 includes a fixed portion 182 and flexible arms 184 that terminate at free ends 186. Spring clamp 180 has a generally triangular shape that receives a triangular weight member. In another embodiment, shown in FIG. 26, a spring clamp 190 includes a fixed portion 192, and flexible arms 194 that terminate at free ends 196. Spring clamp 190 has a generally rhomboid shape that receives a complementary weight member. It should be appreciated that the spring clamp may have many alternative shapes to complement the shape of an accompanying weight member.

Referring now to FIGS. 27-37, a golf club head 200 includes another weight system that provides adjustability of the center of gravity of the golf club head. Adjustment of the location of the center of gravity may be accomplished using a plurality of weight members 204 having different masses interchangeably disposed in a plurality of weight mounts. Weight member 204 is assembled from a weight body 206, a spring clip 208, and a locking mechanism for radially extending at least portions of the spring clip 208. Similar to previous embodiments, the rotation of a locking member forces a spring clip outward to lock the weight member in a location. The locking mechanism includes a locking member 210 and a plurality of rollers 228. Weight member 204 is installed in mount 201 by placing the weight member in an undercut recess that forms the mount 201 and using the locking mechanism to extend the spring clip 208 radially outward so that it is inserted into the undercut 214.

Figure 31:
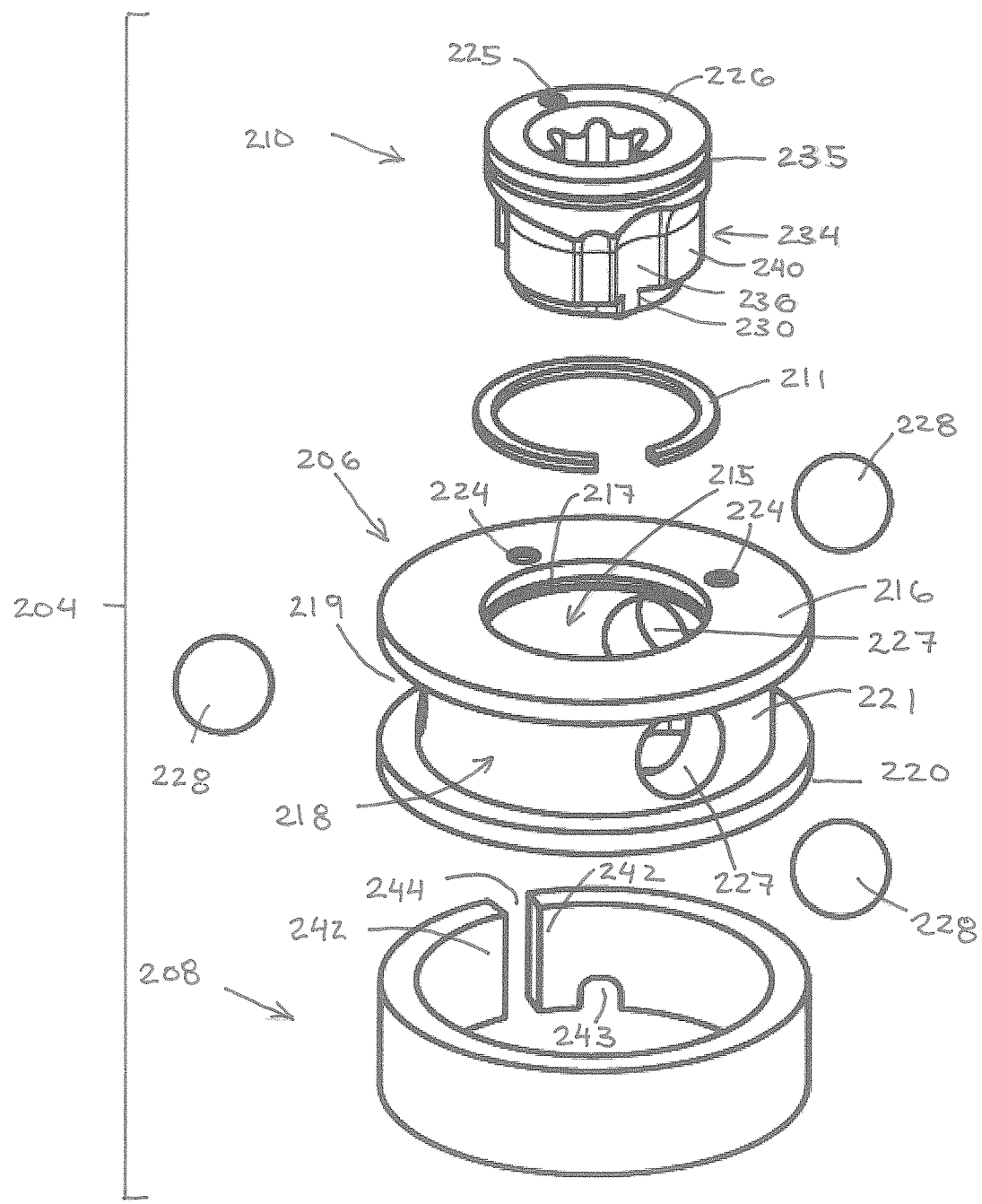
FIG. 31 is an exploded view of the weight member of FIG. 28.
Figure 32:
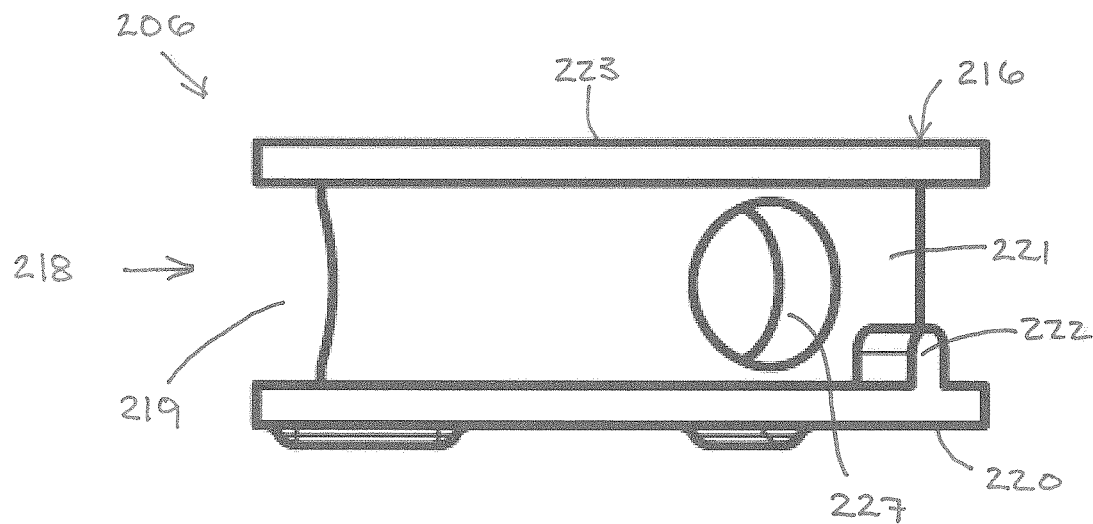
FIG. 32 is a side view of a portion of the weight member of FIG. 28.
Figure 33:
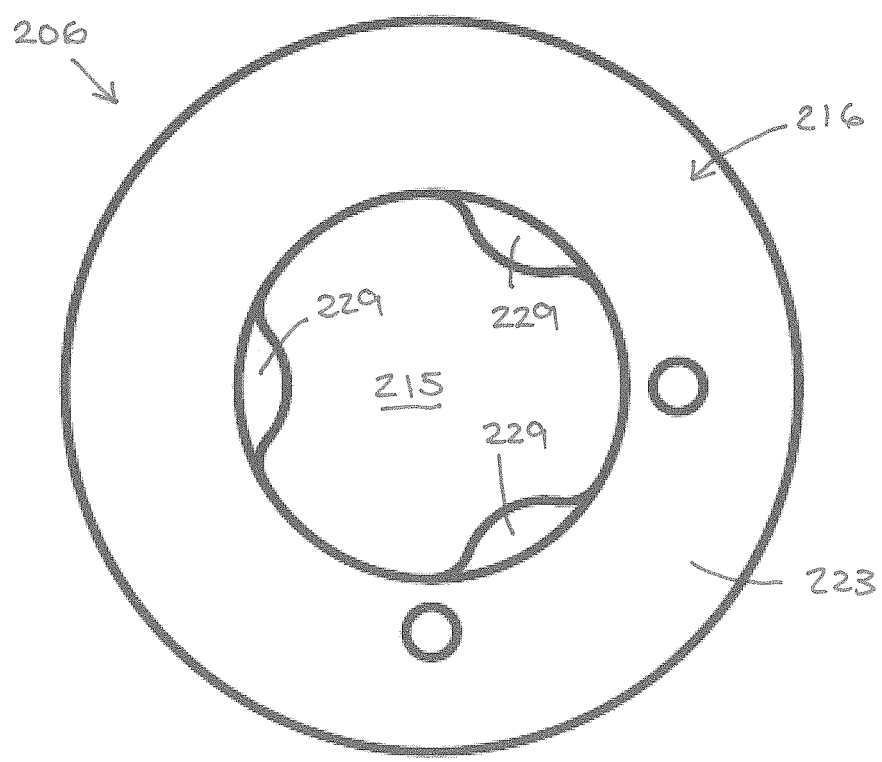
FIG. 33 is a top view of the portion shown in FIG. 32.
Figure 34:
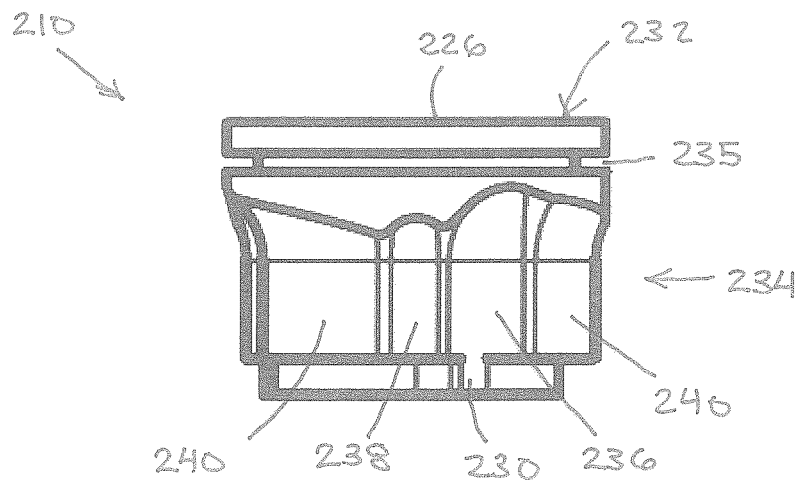
FIG. 34 is a side view of another portion of the weight member of FIG. 28.
Figure 35:
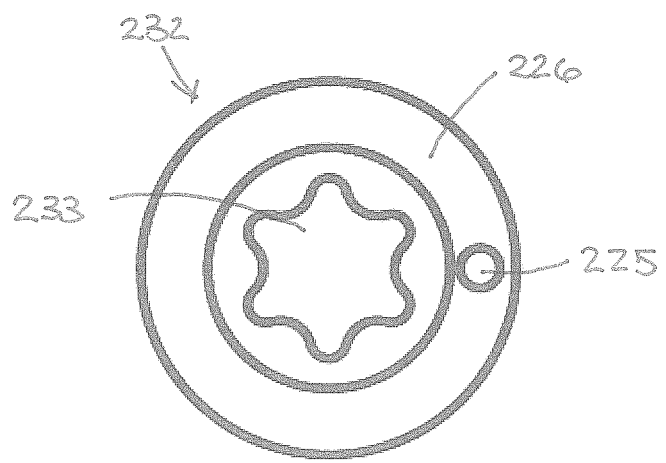
FIG. 35 is a top view of the portion shown in FIG. 34.

Weight body 206 provides the primary source for mass in weight member 204, while providing a frame for supporting spring clip 208 and the mechanism configured to radially extend at least portions of the spring clip 208. In particular, the weight body 206 is a generally tubular body that defines a central bore that forms a locking member mount 215 and that includes an annular first flange 216 that is spaced from an annular second flange 220 by a clip portion 218. The clip portion 218 is annular and has a radially outward surface 221 that is recessed relative to the radially outward edges of the first flange 216 and the second flange 220 to form an annular clip recess 219, as shown in FIGS. 31 and 32. Additionally, a clip alignment feature 222 is disposed in the clip recess 219, and in the present embodiment the clip alignment feature 222 is a rib that interacts with the spring clip 208 to prevent rotation of the spring clip 208 relative to and around the weight body 206. The first flange 216 includes an outer surface 223 that is exposed when the weight member 204 is mounted in a golf club head 200, and the outer surface 223 may include indicia 224 that are used in combination with at least one indicium 225, or index mark, disposed on an outer surface of the locking member 210 to indicate whether the weight member 204 is in a locked or unlocked configuration. A plurality of apertures 227 extend radially through the clip portion 218 of weight body 206 and are configured to retain rollers 228, which may be ball bearings and/or roller pins included in the locking mechanism. The second flange 220 includes travel limit features 229 that extend into the central bore and are positioned around the perimeter of the bore. Travel limit features 229 interact with travel limit features 230 on the locking member 210 to limit the range of rotation of the locking member 210 relative to the weight body 206 in the assembled weight member.

The locking member 210 is disposed in the locking member mount 215 and is rotatably coupled to the weight body 206. The locking member 210 generally includes an outer flange 232 that includes outer surface 226, the at least one indicium 225, the travel limit features 230, a tool engagement feature 233, and a cam surface 234 disposed between the outer flange 232 and the travel limit features 230. The outer flange is spaced from the cam surface by a circumferential groove 235 that receives a snap ring 211. In the assembled weight member 204, the snap ring 211 extends between the circumferential groove 235 in the locking member 210 and a circumferential groove 217 of the weight body 206. When the snap ring 211 is installed between the weight body 206 and the locking member 210, it extends across the interface between the two members and rotatably couples the locking member 210 in the locking member mount 215 so that the locking member 210 can rotate relative to the weight body 206 but is prevented from translating out of the locking member mount 215.

The cam surface 234 generally forms a sidewall of the locking member 210 and includes an unlocked detent feature 236, a locked detent feature 238, and ramp portions 240 that extend between the unlocked and locked detent features 236, 238. The cam surface 234 generally provides a bearing surface that the rollers 228 abut during operation, and is shaped to alter the radial position of the rollers 228 within the weight body 206 by forcing the rollers 228 outward toward the spring clip 208. During operation as the locking member 210 is rotated relative to the weight body 206, the rollers 228 roll along the cam surface 234. Because the radial outer dimension of the cam surface 234 varies between the detents 236, 238 and across the ramp portion 240, the rollers 228 are forced to move radially within the apertures 227. In particular, the radial outer dimension of the cam surface 234 is minimum at the unlocked detents 236, and increases through the adjacent ramp portion 240 until it reaches a maximum radial outer dimension at an end of the ramp portion adjacent a locked detent 238. The outer radial dimension at the locked detents 238 is less than the maximum radial outer dimension but greater than the outer radial dimension at the unlocked detents 236.

The spring clip 208 is a flexible semi-annular member that is disposed in the clip recess 219 of the weight body 206. The spring clip 208 is discontinuous and defines two free ends 242, spaced by a gap 244, that flex away from each other as the spring clip is pushed outward by the rollers 228. The spring clip may also include an alignment feature, such as a slot 243, that engages the clip alignment feature 222 of the weight body 206. The engagement of the slot 243 with the clip alignment feature 222 prevents the spring clip from rotating around the weight body 206 within the clip recess 219, which prevents a roller 228 from becoming aligned with the gap 244 during operation. Such an alignment between the roller 228 and the gap 244 could allow the roller 228 to detach from the weight assembly, reducing the number of rollers 228 influencing the radial movement of the spring clip 208. As an alternative, an end of the spring clip may extended radially inward and into a clip alignment feature that is formed as a slot in the weight body. In another embodiment, not illustrated, the clip alignment feature could be a slot formed in the weight body and the spring clip's alignment feature could include a rib extending into the slot of the weight body.

Figure 36:
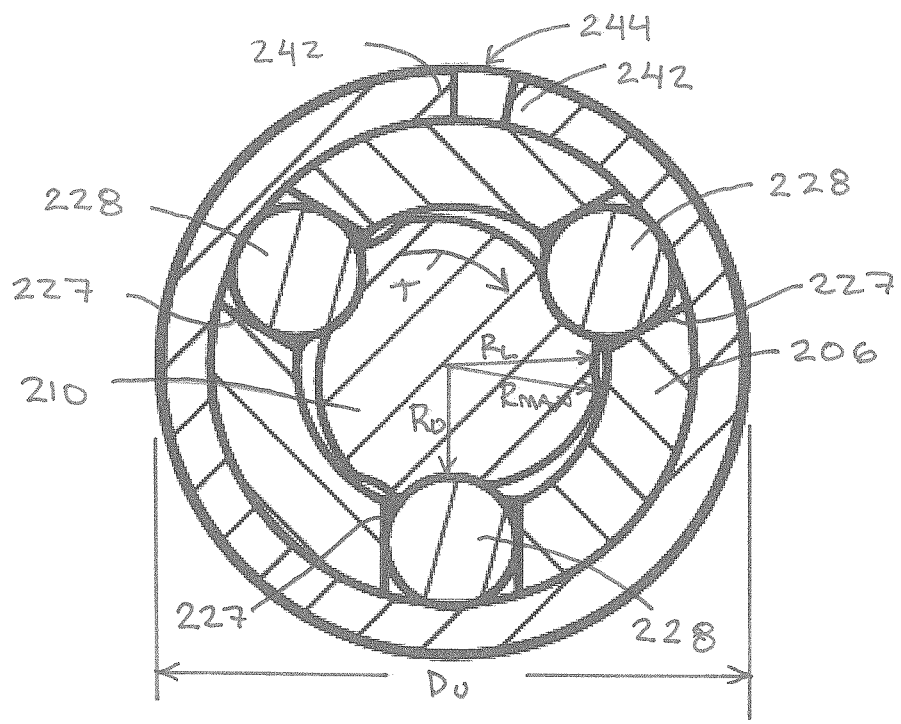
FIG. 36 is a cross-sectional view of the weight member of FIG. 28 in a first configuration, taken along line 36-36 shown in FIG. 29.
Figure 37:
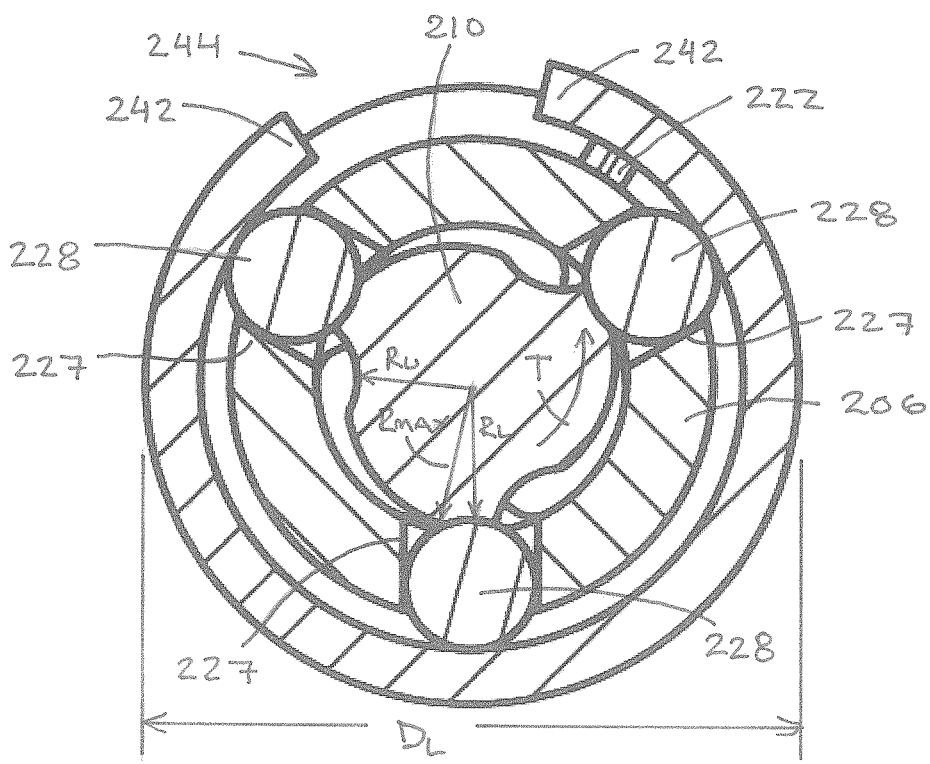
FIG. 37 is another cross-sectional view of the weight member of FIG. 28 in a second configuration, generally corresponding to line 36-36 of FIG. 29.

Referring to FIGS. 36 and 37, operation of the weight member 204 will be described. FIG. 36 illustrates a cross-section of the weight member 204 in an unlocked configuration. In that configuration, the locking member 210 is rotated using a tool inserted into the tool engagement feature 233 so that the unlocked detents 236 are aligned with the radial apertures 227 of the clip portion 218 of the weight body 206. In that orientation, the rollers 228 are forced radially inward by the elasticity of the spring clip 208 and are received in the unlocked detents 236 of the locking member 210. The unlocked detents 236 are sized so that the rollers 228 are positioned so that an outermost part of the roller 228 is generally flush with the outer surface 221 of the clip portion 218, which allows the spring clip 208 to be in intimate contact with the outer surface 221 of the clip portion 218. Each unlocked detent 236 defines a curved outer surface of the cam surface 234 having a minimum outer radial dimension RU, and the curved outer surface is generally curved with a diameter that is at least equal to the diameter of the rollers 228. The spring clip 208 is configured so that it is compressed on the outer surface 221 of the clip portion 218, but the elasticity of the spring clip 208 allows it to be flexed to a larger diameter during operation.

The locking member 210 is rotated within the locking member mount 215 relative to the weight body 206 to transition the weight member 204 between the unlocked configuration, shown in FIG. 36, and the locked configuration, shown in FIG. 37. For example, with the weight member 204 in the unlocked configuration, the weight member 204 is inserted into a weight mount 201 and the locking member 210 is rotated relative to the weight body 206. In the present embodiment, interaction between the travel limit features 230 of the locking member 210 and the travel limit features 229 of the weight body 206 restrict the direction of travel of the locking member 210 relative to the weight body 206 in the direction shown by arrows T. The travel limit features 229 are configured to limit the travel required by the cam portion and the spring clip to fully actuate the weight member. In particular, the weight member is configured to require a predetermined amount of relative rotation between the locking member and the weight body to transpose the weight member between the unlocked and the locked configurations. The weight member may be configured to require less than a full rotation of the lock member relative to the weight body and in certain embodiments, to require between ⅙(60°) and ⅓(120°) of a full rotation. In another embodiment, between 30 and 100 degrees of rotation between the lock member relative to the weight body is required. In another embodiment, between 30 and 80 degrees of rotation between the lock member relative to the weight body is required. In another embodiment, between 50 and 100 degrees of rotation between the lock member relative to the weight body is required.

As the locking member 210 is rotated, the rollers 228 roll along the cam surface 234 and along the ramp portions 240. The ramp portions 240 are dimensioned so that the radial outer dimension increases to a maximum outer radial dimension RMAX toward the locked detent and it is that change in the outer dimension causes the rollers 228 to move radially outward within the apertures 227. As the rollers 228 move outward they abut the inner surface of the spring clip and force the spring clip 208 radially away from the outer surface 221 of the clip portion 218, thereby increasing the overall outer dimension of the weight member 204 from DU to DL.

The locking member 210 is rotated relative to weight body 206 until the weight member 204 is transformed into the locked configuration. In the locked configuration, the rollers 228 are disposed in the locked detents 238. The locked detents 238 are adjacent the location of the ramp portions 240 having RMAX, and the outer radial dimension of the cam surface 234 at the locked detents is RL which is less than RMAX but greater than RU. Preferably, each locked detent 238 defines a curved outer surface of the cam surface 234 having a minimum radial dimension RL, and the curved outer surface is generally curved with a diameter that is at least equal to the diameter of the rollers 228. As described above, the spring clip 208 is configured to elastically squeeze inward when the rollers 228 are extended outward, and because of the difference in the outer radial dimensions at the maximum radial portion of the ramp portions 240 and the locked detents 238, the rollers 228 are forced into the locked detents 238 by the spring action of the spring clip 208 abutting the rollers 228.

Figure 38:
FIG. 38 is a partial cross-sectional view of a golf club head including another embodiment of the weight member of the present invention in a portion of a golf club head.
Figure 39:
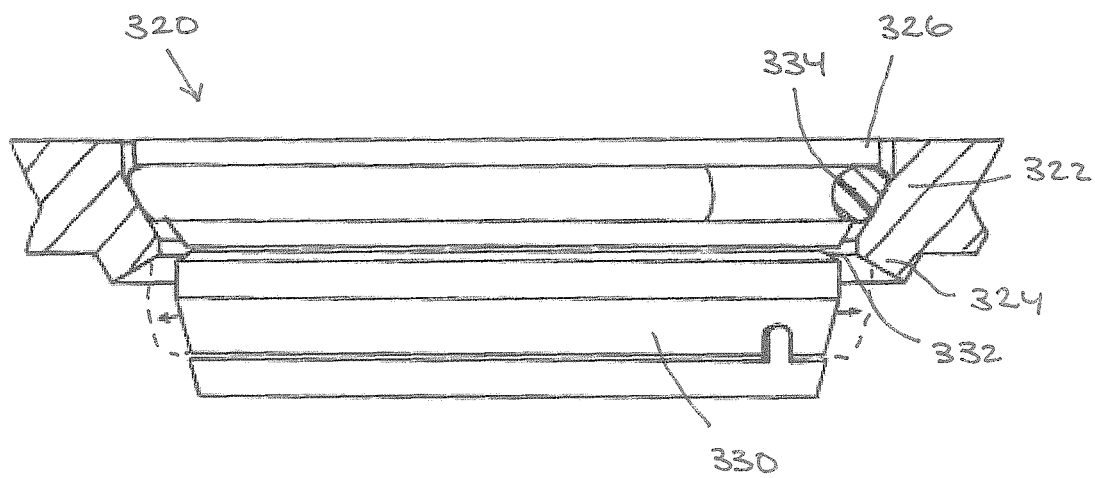
FIG. 39 is a partial cross-sectional view of a golf club head including another embodiment of the weight member of the present invention in a portion of a golf club head.

In additional embodiments, the weight mount of the golf club head body may be formed simply by including an aperture in a wall of the golf club head, as shown in FIGS. 38 and 39. In a first example, shown in FIG. 38, a weight mount is formed by an aperture in a wall of a golf club head body and a weight member 310 is provided that includes an outer flange 312 that abuts an outer surface of the golf club head. The interaction between the outer flange 312 of the weight member and the outer surface limits the insertion of the weight member 310 into the golf club head and provides friction so that the weight member can be converted between the locked and unlocked configurations. When the weight member 310 is placed in the locked configuration, the edge of the aperture is interposed between the outer flange 312 and a spring clip 314 included in the weight member 310. Weight member 310 also preferably includes a flange gasket 316 that is disposed between the outer flange 312 and the outer surface of the golf club head body. The flange gasket 316 may be used to increase friction between the outer flange 312 and the outer surface of the head, so that it is easier for a user to turn a locking member of the weight member 310 relative to a weight body of the weight member 310 allowing for the weight to be selectively placed in the locked or unlocked configurations. The flange gasket 316 may also, or alternatively, be configured to prevent ingress of water or debris into the golf club head when the weight member 310 is installed. The flange gasket 316 may be an O-ring or other gasket, or it may be a plurality of discrete pads. The flange gasket 316 may be constructed of compressible or non-compressible material and it may include a roughened or textured surface.

In another example, shown in FIG. 39, a weight member 320 is configured to be installed in a weight mount formed by an aperture in the golf club head. The aperture includes tapered portions of the sidewall of the mount. In particular, a portion of the aperture that forms the weight mount includes an outer portion 322 that includes sidewalls that are tapered so that the weight mount narrows further into the golf club head, and an inner portion 324. The inner portion 324 also includes tapered sidewalls, but the taper is oriented so that the weight mount widens further into the golf club head. The weight member includes an outer flange 326 that abuts the tapered surface of the outer portion 322 of the weight mount. The weight member 320 is generally constructed as previous examples and includes a weight body 328 that includes the outer flange 326, a spring clip 330, and a locking mechanism for radially extending at least portions of the spring clip 330. In the present embodiment, the spring clip 330 includes a tapered edge 332 that abuts the inner portion 324 of the weight mount when the spring clip 330 is extended. The interaction between the two tapered surfaces tends to draw the weight member 320 further into the weight mount which compresses a gasket 334, such as an O-ring, disposed between the tapered outer flange 326 and the outer portion 322 of the weight mount.

Referring now to FIGS. 48-55, a golf club head 400 includes another weight system that provides adjustability of the center of gravity of the golf club head. Similar to other embodiments described herein, adjustment of the location of the center of gravity may be accomplished by incorporating a plurality of weight mounts 402 in the golf club head 400 and using a plurality of weight members 404 having different masses interchangeably disposed in the plurality of weight mounts 402.

Weight member 404 is assembled from a weight body 406, a spring clip 408, and a locking mechanism for radially extending at least portions of the spring clip 408. Similar to previous embodiments, the rotation of a locking member 410 forces spring clip 408 outward to lock the weight member 404 in weight mount 402. The weight body 406 of weight member 404 is configured to provide a mechanical interaction with the weight mount 402 to prevent relative rotation between the weight body 406 and the weight mount 402 to simplify the operation of the weight system. The locking mechanism includes a locking member 410 and a plurality of rollers 428. Weight member 404 is installed in weight mount 402 by placing the weight member 404 in an aperture, or a recess, that provides an undercut and that forms the mount 402 and using the locking mechanism to extend the spring clip 408 radially outward so that at least a portion of the spring clip 408 is inserted into the undercut 414.

Figure 51:
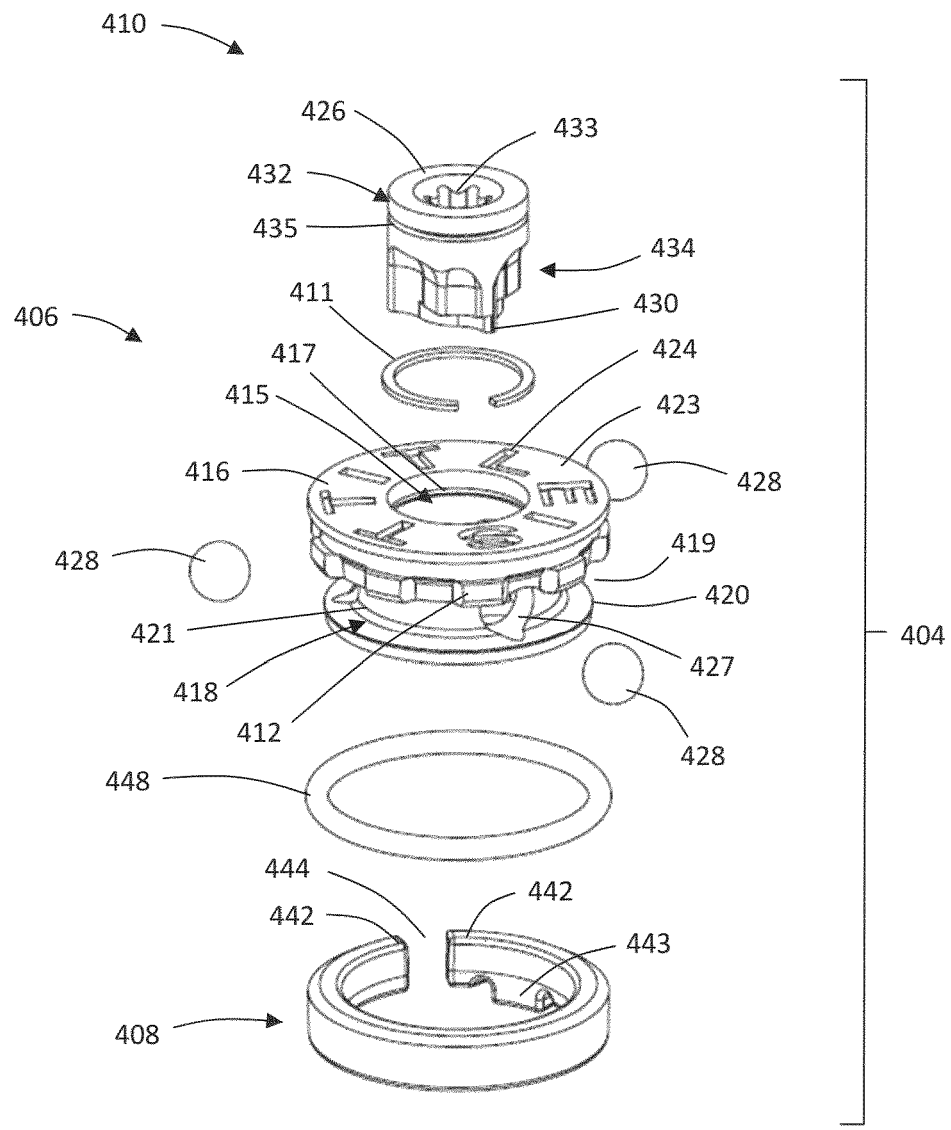
FIG. 51 is an exploded view of the weight member of FIG. 50.
Figure 52:
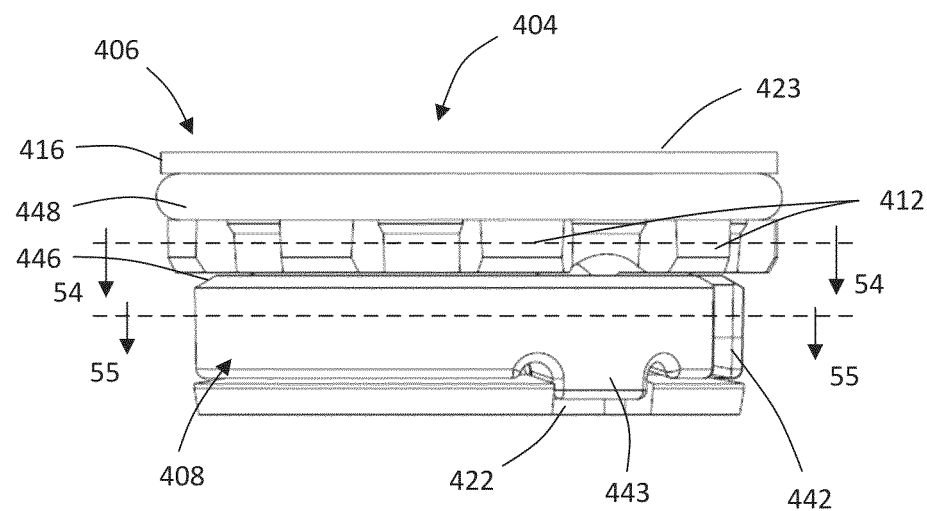
FIG. 52 is a side view of the weight member of FIG. 50.
Figure 53:
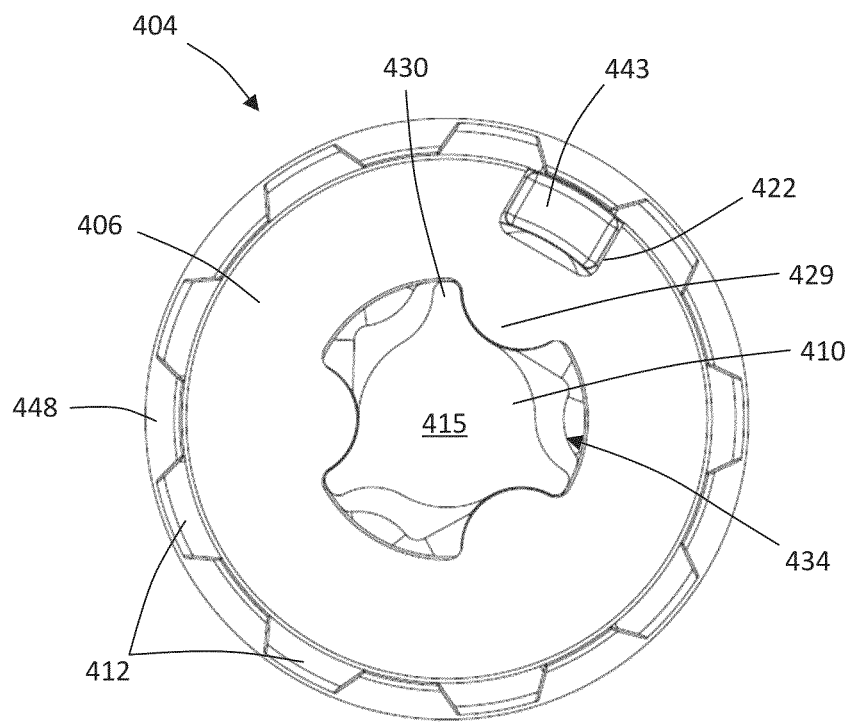
FIG. 53 is a bottom view of the weight member of FIG. 50.
Figure 54:
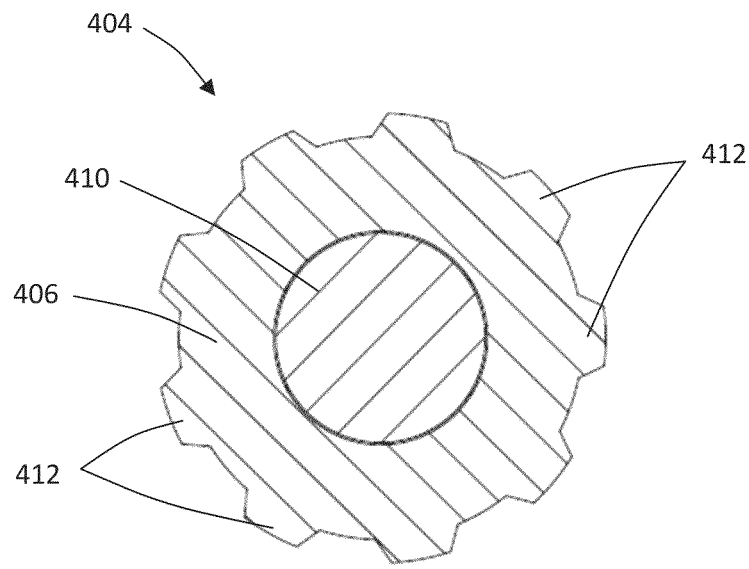
FIG. 54 is a cross-sectional view of the weight member of FIG. 50 in a first configuration, taken along line 54-54 shown in FIG. 52.

Weight body 406 provides the primary source for mass in weight member 404, while providing a frame for supporting spring clip 408 and the locking mechanism. In particular, the weight body 406 is a generally tubular body that defines a central bore that forms a locking member mount 415 and that includes an annular first flange 416 that is spaced from an annular second flange 420 by a clip portion 418. A plurality of spline tabs 412 are included on first flange 416 that are configured to interact with spline tabs 413 of a side wall of weight mount 402 to prevent relative rotation between the weight body 406 and the weight mount 402 during locking and unlocking of the weight member 404. The configuration of the spline tabs allows for a simplified construction of the weight mount 402 because a base of the weight mount 402 is not required and the weight mount can be constructed as an aperture in a wall of the golf club head 400. The clip portion 418 is annular and has a radially outward surface 421 that is recessed relative to the radially outward edges of the first flange 416 and the second flange 420 to form an annular clip recess 419, as shown in FIG. 51. Additionally, an alignment feature 422 is disposed in the second flange 420, and in the present embodiment the alignment feature 422 is a slot that interacts with a tab 443 on the spring clip 408 to prevent rotation of the spring clip 408 relative to and around the weight body 406. The first flange 416 includes an outer surface 423 that is exposed when the weight member 404 is mounted in a golf club head 400, and the outer surface 423 may include indicia 424 that can be used in combination with at least one indicium, or index mark, disposed on an outer surface of the locking member 410 to indicate whether the weight member 404 is in a locked or unlocked configuration. Alternatively, or in addition, the indicia 424 can be used to indicate the overall mass of the weight member 404 and/or the manufacturer, or to provide desired aesthetics. A plurality of apertures 427 extend radially through the clip portion 418 of weight body 406 and are configured to retain rollers 428, which may be ball bearings and/or roller pins included in the locking mechanism. The second flange 420 includes travel limit features 429 that extend into the locking member mount 415. Travel limit features 429 interact with travel limit features 430 on the locking member 410 to limit the range of rotation of the locking member 410 relative to the weight body 406 in the assembled weight member 404.

The locking member 410 is disposed in the locking member mount 415 and is rotatably coupled to the weight body 406. The locking member 410 generally includes an outer flange 432 that includes outer surface 426, the travel limit features 430, a tool engagement feature 433, and a cam surface 434 disposed between the outer flange 432 and the travel limit features 430. The outer flange 432 is spaced from the cam surface 434 by a circumferential groove 435 that receives a snap ring 411. In the assembled weight member 404, the snap ring 411 extends between the circumferential groove 435 in the locking member 410 and a circumferential groove 417 of the weight body 406. When the snap ring 411 is installed between the weight body 406 and the locking member 410, it extends across the interface between the two members and rotatably couples the locking member 410 in the locking member mount 415 so that the locking member 410 can rotate relative to the weight body 406 but is prevented from translating out of the locking member mount 415.

The cam surface 434 generally forms a sidewall of the locking member 410 and includes an unlocked detent feature 436, a locked detent feature 438, and ramp portions 440 that extend between the unlocked and locked detent features 436, 438. The cam surface 434 generally provides a bearing surface that the rollers 428 abut during operation and is shaped to alter the radial position of the rollers 428 within the weight body 406 by forcing the rollers 428 outward toward the spring clip 408. During operation, as the locking member 410 is rotated relative to the weight body 406, the rollers 428 roll along the cam surface 434. Because the radial outer dimension of the cam surface 434 varies between the detents 436, 438 and across the ramp portion 440, the rollers 428 are forced to move radially within the apertures 427. In particular, the radial outer dimension of the cam surface 434 is minimum at the unlocked detents 436 and increases through the adjacent ramp portion 440 until it reaches a maximum radial outer dimension at an end of the ramp portion 440 adjacent a locked detent 438. The outer radial dimension at the locked detents 438 is less than the maximum radial outer dimension but greater than the outer radial dimension at the unlocked detents 436.

The spring clip 408 is a flexible semi-annular member that is disposed in the clip recess 419 of the weight body 406. The spring clip 408 is discontinuous and defines two free ends 442, spaced by a gap 444, that flex away from each other as the spring clip 408 is pushed outward by the rollers 428. The spring clip 408 can also include an alignment feature, such as tab 443, that engages the alignment feature 422 of the weight body 406. The engagement of the tab 443 with the alignment feature 422 prevents the spring clip 408 from rotating around the weight body 406 within the clip recess 419, which prevents a roller 428 from becoming aligned with the gap 444 during operation. Such an alignment between the roller 428 and the gap 444 could allow the roller 428 to detach from the weight assembly, thereby reducing the number of rollers 428 influencing the radial movement of the spring clip 408.

The spring clip 408 can also include a tapered edge 446 that that is configured to abut the inner portion of the weight mount 402 when the spring clip 408 is extended. For example, the inner portion of the weight mount 402 can a tapered wall so that the undercut 414 is tapered. For example, an innermost wall of one or more of the spline tabs 413 of the weight mount 402 can be tapered to form a tapered flange. Extension of the spring clip 408 when the weight member is in the locked configuration can force the tapered edge 446 to abut the tapered wall. The interaction between the two tapered surfaces tends to draw the weight member 404 further into the weight mount 402.

A gasket 448 can be included to extend across a gap between the first flange 416 of the weight body 406 and the weight mount 402. For example, the gasket 448 can be a compressible O-ring. In an example embodiment, as the weight member 404 is drawn further into the weight mount 402 by the interaction between the two tapered surfaces, the gasket 448 compresses and provides a seal of the gap between the weight body 406 and the weight mount 402.

Figure 55:
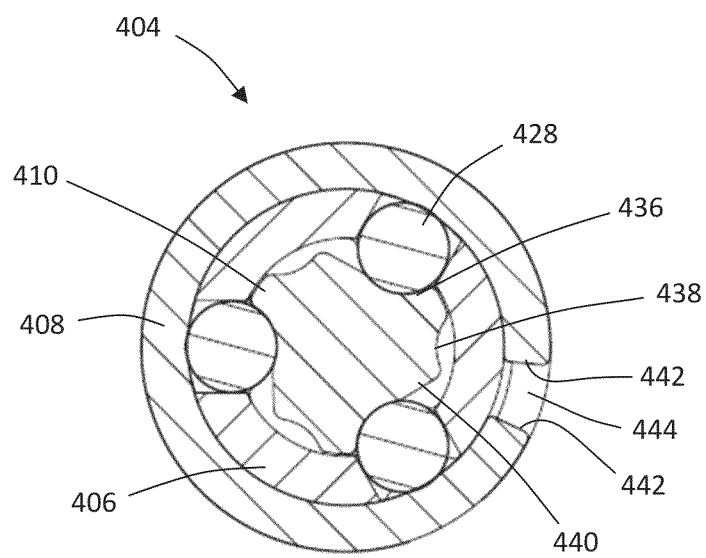
FIG. 55 is a cross-sectional view of the weight member of FIG. 50 in a first configuration, taken along line 55-55 shown in FIG. 52.

FIG. 55 illustrates a cross-section of the weight member 404 in an unlocked configuration. In that configuration, the locking member 410 is rotated using a tool inserted into the tool engagement feature 433 so that the unlocked detents 436 are aligned with the radial apertures 427 of the clip portion 418 of the weight body 406. In that orientation, the rollers 428 are forced radially inward by the elasticity of the spring clip 408 and are received in the unlocked detents 436 of the locking member 410. The unlocked detents 436 are sized so that the rollers 428 are positioned so that an outermost part of the roller 428 is generally flush with the outer surface 421 of the clip portion 418, which allows the spring clip 408 to be in intimate contact with the outer surface 421 of the clip portion 418. Each unlocked detent 436 defines a curved outer surface of the cam surface 434, and the curved outer surface is generally curved with a diameter that is at least equal to the diameter of the rollers 428. The spring clip 408 is configured so that it is compressed on the outer surface 421 of the clip portion 418, but the elasticity of the spring clip 408 allows it to be flexed to a larger diameter during operation.

Similar to previously described embodiments, the locking member 410 can be rotated within the locking member mount 415 relative to the weight body 406 to transition the weight member 404 between the unlocked configuration, shown in FIG. 55, and the locked configuration. For example, with the weight member 404 in the unlocked configuration, the weight member 404 is inserted into a weight mount 402 so that the spline tabs 412 of the weight body 406 interlock with the spline tabs 413 of the weight mount 402 and the locking member 410 is rotated relative to the weight body 406. Interaction between the travel limit features 430 of the locking member 410 and the travel limit features 429 of the weight body 406 restrict the range, and direction, of travel of the locking member 410 relative to the weight body 406.

The travel limit features 429 and the cam surface 434 are configured to provide a desired range of travel required by the locking member 410 to fully actuate the weight member 404. In particular, the weight member is configured to require a predetermined amount of relative rotation between the locking member 410 and the weight body 406 to transpose the weight member 404 between the unlocked and the locked configurations. The weight member may be configured to require less than a full rotation of the lock member relative to the weight body and in certain embodiments, to require between ⅙(60°) and ⅓(120°) of a full rotation. In another embodiment, between 30 degrees and 100 degrees of rotation of the lock member relative to the weight body is required. In another embodiment, between 30 degrees and 80 degrees of rotation of the lock member relative to the weight body is required. In another embodiment, between 50 degrees and 100 degrees of rotation of the lock member relative to the weight body is required.

As the locking member 410 is rotated relative to the weight body 406, the rollers 428 roll along the cam surface 434 and along the ramp portions 440. The ramp portions 440 are dimensioned so that the radial outer dimension increases to a maximum outer radial dimension toward the locked detent and it is that change in the outer dimension causes the rollers 428 to move radially outward within the apertures 427. As the rollers 428 move outward, they abut the inner surface of the spring clip and force the spring clip 408 radially away from the outer surface 421 of the clip portion 418, thereby increasing the overall outer dimension of the weight member 404.

The locking member 410 is rotated relative to weight body 406 until the weight member 404 is transformed into the locked configuration. In the locked configuration, the rollers 428 are disposed in the locked detents 438. The spring clip 408 is configured to elastically squeeze inward when the rollers 428 are extended outward, and because of the difference in the outer radial dimensions at the maximum radial portion of the ramp portions 440 and the locked detents 438, the rollers 428 are forced into the locked detents 438 by the spring action of the spring clip 408 abutting the rollers 428.

Figure 56:
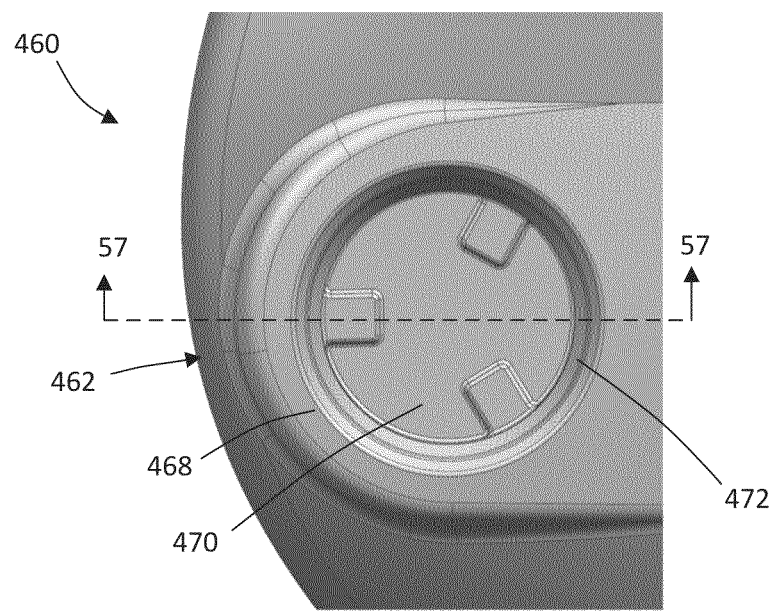
FIG. 56 is a bottom view of a portion of another embodiment of a golf club head including a weight mount.
Figure 57:
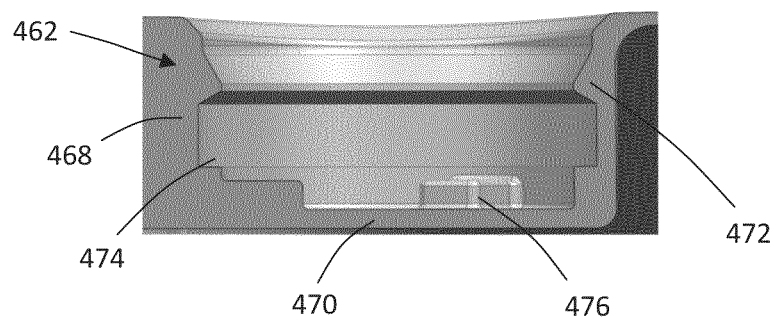
FIG. 57 is a cross-sectional view of the portion of the golf club head of FIG. 56, taken along line 57-57 shown in FIG. 56.
Figure 58:
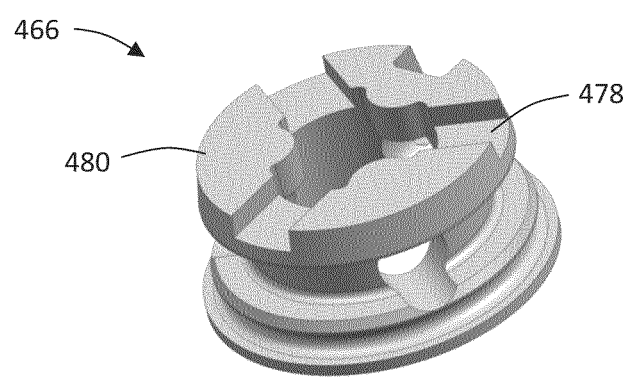
FIG. 58 is a perspective view of a portion of a weight member configured to engage the weight mount of the golf club head of FIG. 56.
Figure 59:
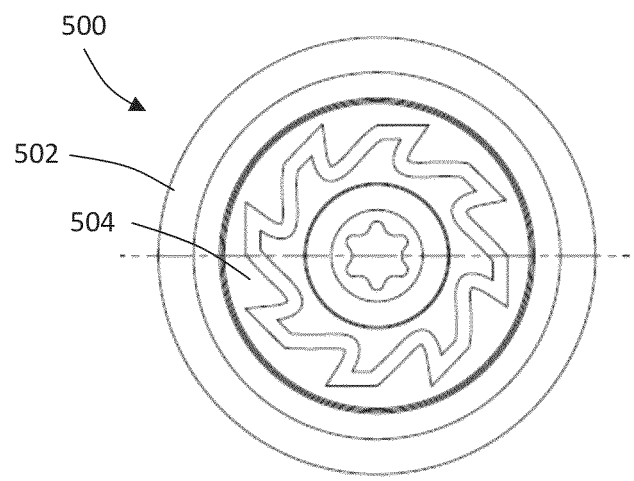
FIG. 59 is a top view of a weighted grip assembly in accordance with the present invention.
Figure 60:
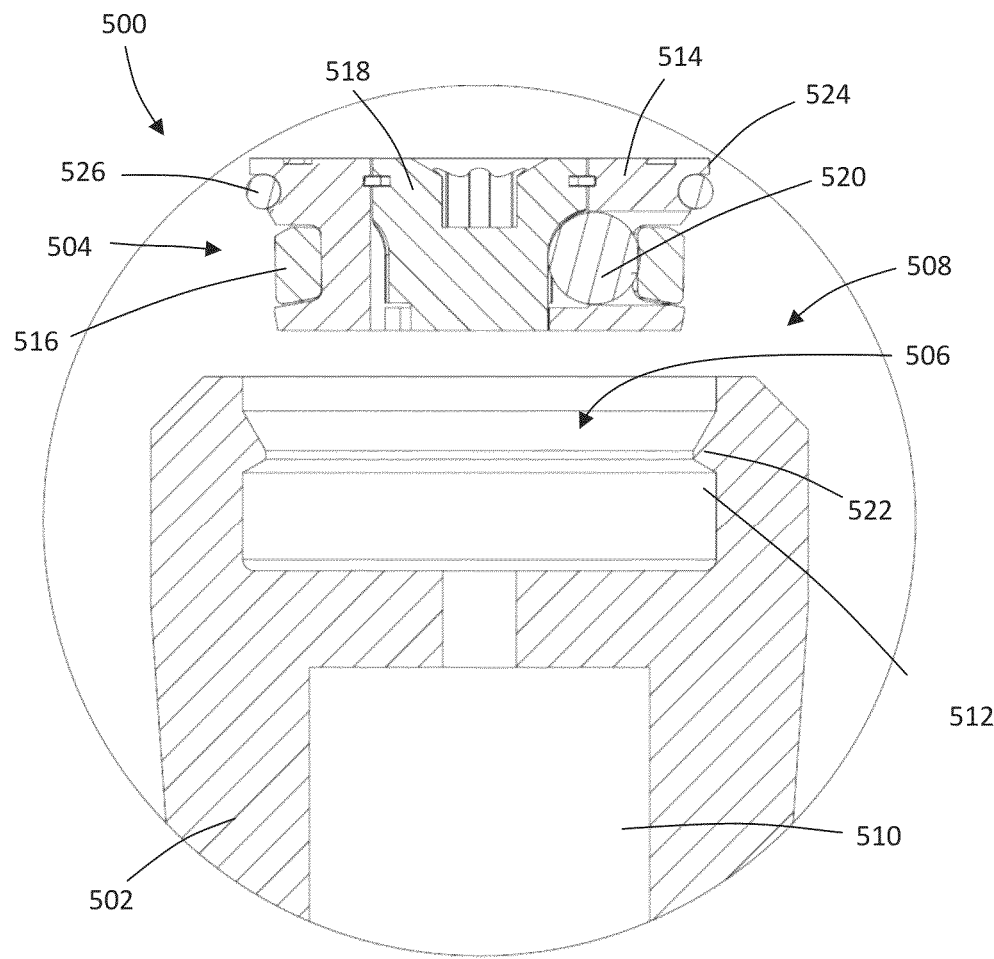
FIG. 60 is an exploded cross-sectional view of the weighted grip assembly of FIG. 59 generally corresponding to line 60-60 of FIG. 59.

Referring to FIGS. 56-58, alternative constructions of a weight mount 462 and a weight body 466 will be described that are configured to prevent relative rotation between the weight mount 462 and the weight body 466. For example, weight mount 462 is constructed from a side wall 468 and a base 470. The side wall 468 extends inward from an outer surface of the golf club head 460 to the base 470. The side wall 468 includes a circumferential flange 472 that forms an undercut recess 474 of the weight mount 462. The undercut recess 474 is configured to interact with a spring clip of a weight member, such as spring clip 408 of weight member 404 described above. The base 470 includes a plurality of projections 476 that are configured to engage a plurality of slots 478 included in a flange of weight body 466 when the weight body 466 is incorporated into a weight member construction that is installed in the weight mount 462. It should be appreciated that the weight body 466 is constructed to be incorporated into a weight member having a locking mechanism that functions similar to those described above. Still further, it should be appreciated that the configuration of projections 476 and slots 478 can be incorporated into the weight mount and weight body described above in relation to FIGS. 27-37, to provide an anti-rotation feature between the weight mount and the weight body.

Referring to FIGS. 59-62, a weighted grip assembly 500 will be described. For example, weighted grip assembly 500 includes an elongate grip body 502 and a weight member 504. The elongate grip body 502 defines a butt end 508 and includes a weight mount 506 integrated into butt end 508 of the grip body 502, and a shaft bore 510 that is configured to receive a butt end of a golf club shaft. The weight mount 506 is shaped to allow the weight member 504 to be inserted and selectively locked therein. For example, the weight mount includes an aperture defined by an outer surface of the grip body 502, and the weight mount 506 defines an undercut 512 adjacent the aperture that is configured to interact with a portion of the weight member 504 to lock the weight member 504 into the weight mount 506. The grip body 502 can be constructed from any resilient material, such as polyurethane polymer, and the material can have any selected durometer. In an example embodiment, a portion of the grip body including the weighting mount 506 has a durometer of about Shore A 77. Additionally, the grip body 502 can have a co-molded construction and the weight mount 506 can be formed in a co-molded member that is constructed from a material that is different than the remainder of the grip body 502.

The weight member 504 is assembled from a weight body 514, a spring clip 516, and a locking mechanism for radially extending at least portions of the spring clip 516. For example, the locking mechanism includes a locking member 518 and a plurality of rollers 520 and rotation of the locking member 518 relative to the weight body 514 forces spring clip 516 outward to lock the weight member 504 in weight mount 506. Any of the weight member and corresponding weight mount constructions described herein can be incorporated into weight member 504 and the weight mount 506.

Figure 61:
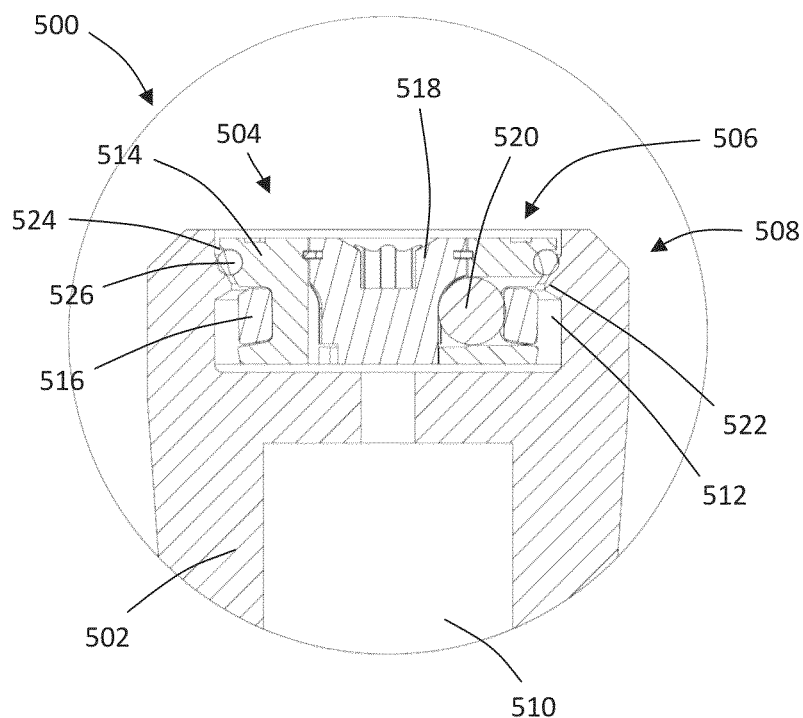
FIG. 61 is a cross-sectional view of the weighted grip assembly, generally corresponding to line 60-60 of FIG. 59, in a first configuration.

During use, the weight member 504, in an unlocked configuration, can be inserted into the weight mount 506, as shown in FIG. 61. In particular, the overall outer dimension of the weight member 504 when it is in the unlocked configuration provides clearance for a portion of the weight member including the spring clip 516 to be inserted past a flange 522 and to a depth where the spring clip 516 is located adjacent the undercut 512. In the illustrated embodiment, the weight body 514 includes a first flange 524 that is configured to abut flange 522 to control the depth of the weight member 504 in the weight mount. Additionally, the weight member 504 can include a gasket 526 that can be compressed between the first flange 524 and the flange 522 to provide a seal between the weight member 504 and the grip body 502.

Figure 62:
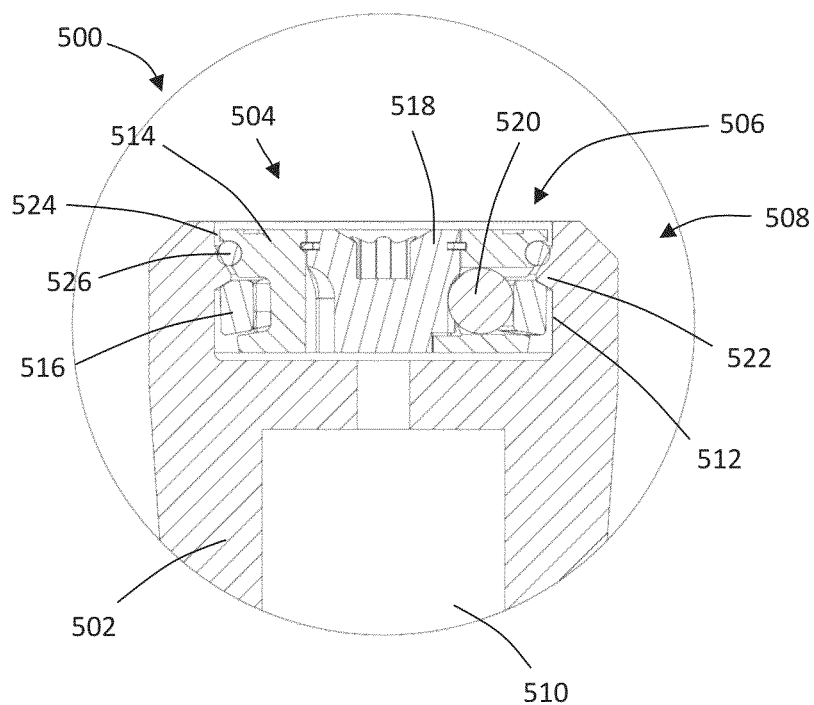
FIG. 62 is a cross-sectional view of the weighted grip assembly, generally corresponding to line 60-60 of FIG. 59, in a second configuration.

After the weight member 504 is inserted into the weight mount 506 to the predefined depth defined by the interaction between the weight member 504 and the weight mount 506, the weight member 504 can be converted into the locked configuration, shown in FIG. 62. For example, the weight member 504 can be converted into the locked configuration by rotating locking member 518 relative to the weight body 514. The relative rotation causes the spring clip 516 to be extended outward and into the undercut 512. In example embodiments, the spring clip 516 abuts the flange 522 in the undercut 512 and that interaction draws the weight member 504 further into the weight mount 506 to retain the weight member. The weight member 504 can be converted back to the unlocked configuration and removed from the weight mount 506, if desired, by reversing the rotation of the locking member 518 relative to the weight body 514.

Another embodiment of a weight member according to the present invention is illustrated in FIGS. 40-43. A weight member 250 generally includes a weight body 252, a plurality of lock tabs 254, a locking member 256, and a lock tab retractor such as one or more magnetic inserts. The weight body 252 provides the primary source for mass in the weight member 250, while providing a frame for supporting lock tabs 254 and a mechanism configured to radially extend and retract the lock tabs 254. In particular, the weight body 252 is a generally hollow body formed by an inner wall 258, an outer wall 260 and a side wall 262 extending between the inner wall 258 and the outer wall 260 to define a cavity 263. The side wall 262 defines a plurality of apertures 264 that receive the plurality of lock tabs 254. The cavity 263 is generally cylindrical and receives a cam portion of the locking member 256 and a portion of each of the plurality of lock tabs 254. The weight body 252 is generally formed from multiple components that are coupled using adhesives, welding, brazing, etc. The components generally include a parting line on the side wall 262 of the weight body 252 and may include a plurality of alignment features 265, such as projections or pins, on one component that engage complementary alignment features, such as bores or recesses, on the other component to align the two components relative to each other.

The locking member 256 includes a cam portion 266 that is generally a flange having an elliptical perimeter shape, support projections 268, magnetic inserts 270. The cam portion 266 abuts the lock tabs 254 and forces them radially outward into the locked position, shown in FIG. 43. The magnetic inserts 270 are disposed in the perimeter of the cam portion 266. The magnetic inserts 270 are chosen so that they provide polarity that works in conjunction with magnetic inserts 271 on the lock tabs 254 to assist in pushing the lock tabs 254 toward the locking position and retracting the lock tabs into the unlocked position as the locking member is rotated. In the illustrated example, each of the lock tabs includes a magnetic insert 271 having a positive pole adjacent the locking member, and the locking member includes magnetic inserts 270 oriented with positive poles oriented radially outward along the major axis of the cam portion and magnetic inserts 270 with negative poles oriented radially outward along the minor axis of the cam portion. As an alternative, a magnetic insert may be included on only one of the cam portion and the lock tab, and the other of the cam portion and the lock tab at least partially constructed of a ferrous material so that magnetic attraction retracts the lock tab. Additionally, the cam portion may only include magnetic inserts designed to attract the lock tabs, relying on the cam itself to push the lock tabs outward. In an alternative embodiment, the cam portion may also be made of a ferrous material and the lock tabs could include magnetic inserts configured to pull the lock tabs towards the cam portion.

The support projections 268 of locking member 256 are cylindrical projections extending away from the center of the elliptical cam portion 266 and into apertures 272 defined by weight body 252. The apertures 272 and cavity 263 are sized to receive the support projections 268 and cam portion, respectively, while allowing them to rotate relative to the weight body 252.

The lock tabs 254 extend through the apertures 264 in the side wall of the weight body 252 and are tapered so that their travel radially outward is limited by the size of the apertures 264. As illustrated, the apertures 264 are tapered to match the side wall taper of the lock tabs 254, and the taper is oriented so that the apertures 264 are the smallest at their radially outward extent. Additionally, the smallest portion of each aperture 264 is narrower than the widest portion of the lock tab 254. As a result, the lock tabs 254 are installed from the cavity side of the side wall 262 of the weight body 252. After the lock tabs 254 are inserted, the locking member 256 is installed in the cavity 263 and the body assembled, thereby retaining the lock tabs 254 in the cavity 263. The outer surface of cam portion 266 of locking member 256 includes flats 274 that act as detents for the lock tabs 254 when the weight member 250 is in the locked configuration.

Figure 42:
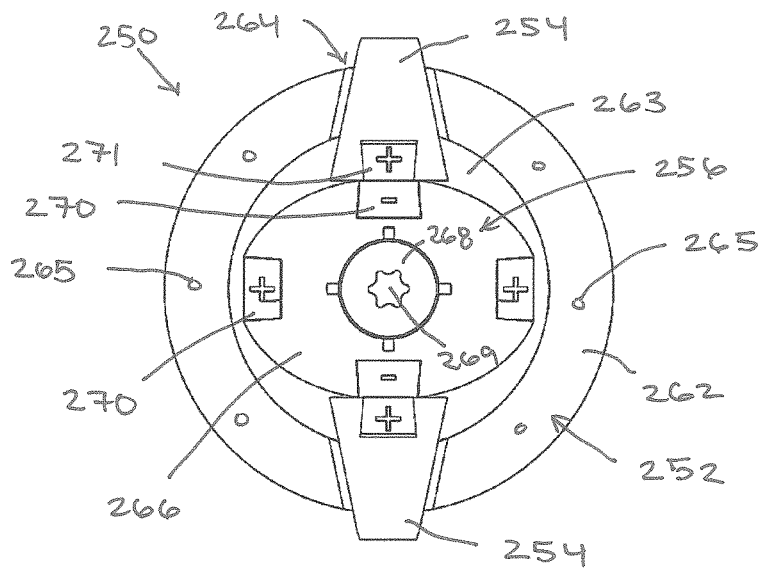
FIG. 42 is a top view of a portion of the weight member of FIG. 40 in the first configuration.
Figure 43:
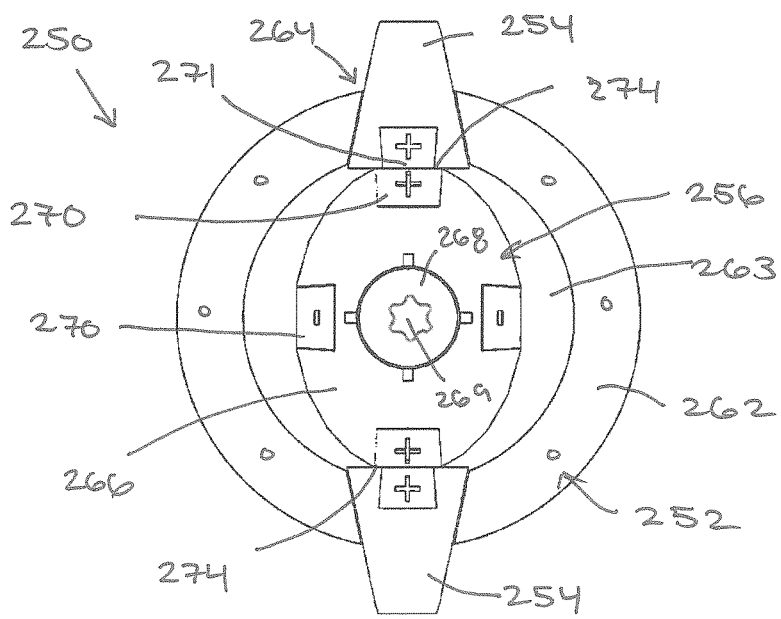
FIG. 43 is a top view of the portion of the weight member of FIG. 41 in the second configuration.

A user may selectively convert the weight member 250 between the unlocked configuration, shown in FIG. 42, and the locked configuration, shown in FIG. 43. In particular, the user inserts a tool into a tool engagement feature 269 and the locking member 256 is rotated relative to weight body 252 between the unlocked configuration and the locked configuration. In general, in the unlocked configuration, the minor axis of the elliptical cam portion 266 is aligned with the lock tabs 254, which places magnetic inserts 270 of the locking member 256 adjacent magnetic inserts 271 of the lock tabs 254 having opposite polarities so that the lock tabs 254 are pulled radially inward. As the locking member 256 is rotated from the unlocked configuration, the outer perimeter of the cam portion 266 abuts the lock tabs 254 and forces the lock tabs further into apertures 264. When the locking member 256 is fully rotated into the locked configuration, the major axis of the elliptical cam portion 266 is aligned with the lock tabs 254, which places the magnetic inserts 270 of the locking member 256 adjacent magnetic inserts 271 of the lock tabs 254 having the same polarities so that the lock tabs 254 are urged away from the cam portion 266. In the locked configuration, the lock tabs 254 are urged into abutment with the sidewall 262 of the weight body 252 in the apertures 264, and flats 274 on the cam portion 274 are adjacent the innermost surfaces of the lock tabs 254. The flats shown form detents that provide resistance from turning the locking member from the locked orientation.

Figure 40:
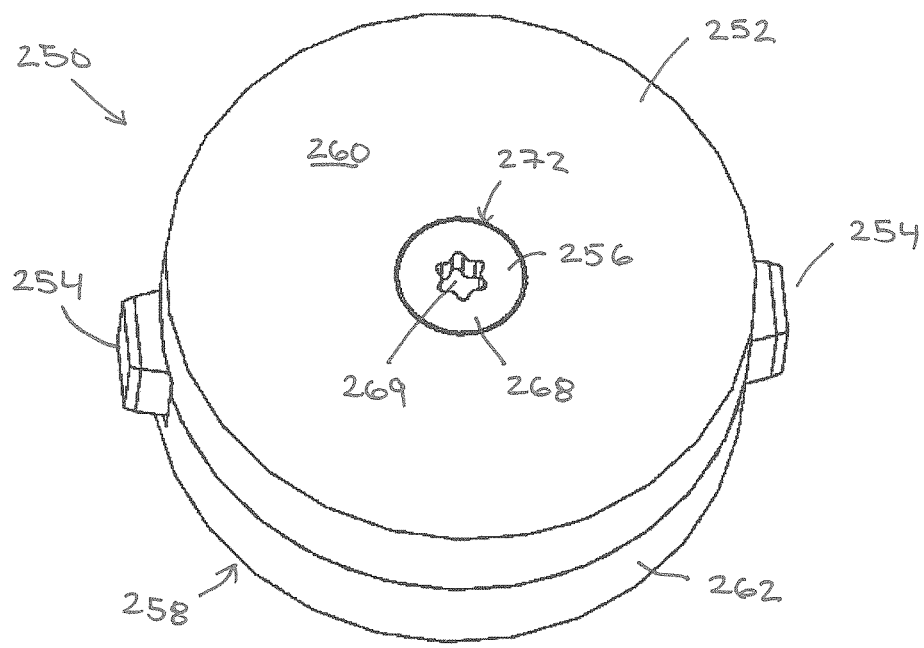
FIG. 40 is a perspective view of another weight member in accordance with the present invention in a first configuration.
Figure 41:
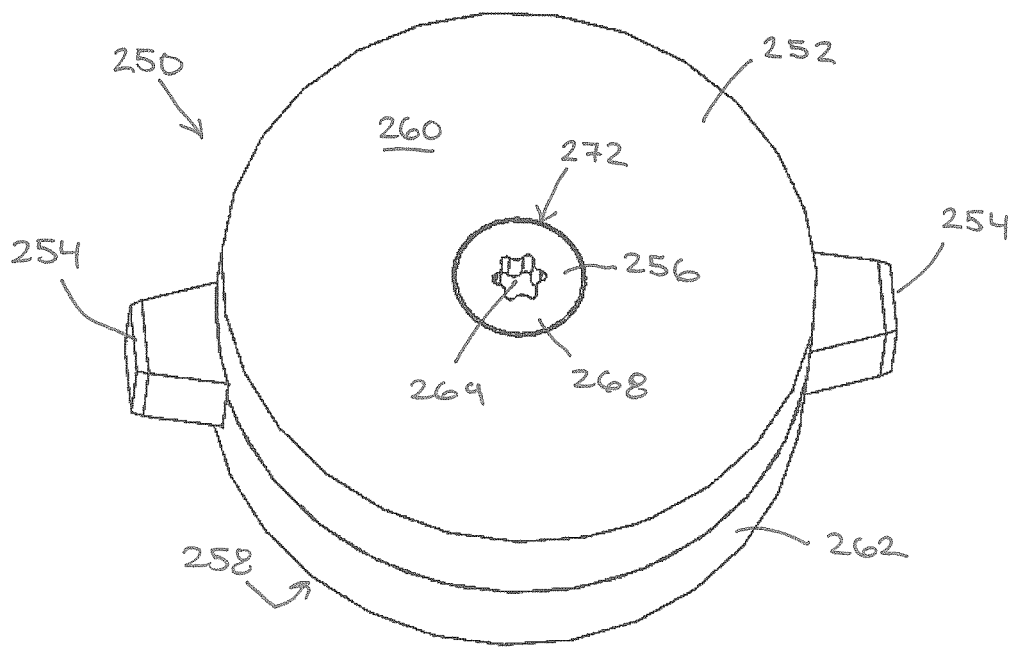
FIG. 41 is a perspective view of the weight member of FIG. 40 in a second configuration.
Figure 44:
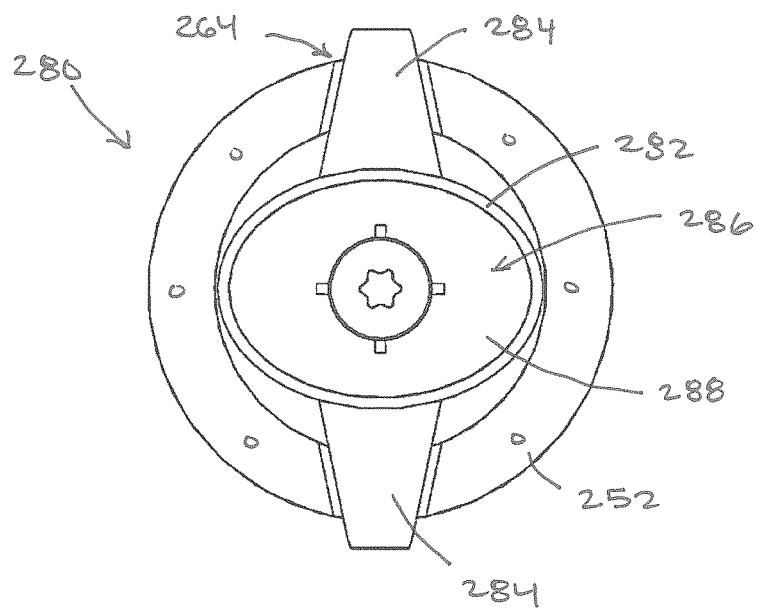
FIG. 44 is a top view of a portion of an alternative construction of the weight member of FIG. 40 in the first configuration.
Figure 45:
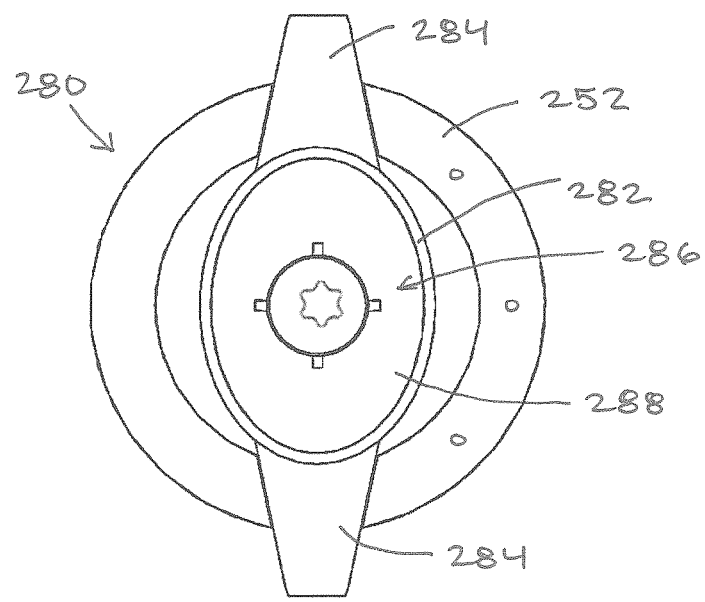
FIG. 45 is a top view of the portion of the weight member of FIG. 41 in the second configuration.

Additional embodiments having an outer appearance identical to that of weight member 250 shown in FIGS. 40 and 41 may utilize spring clips instead of magnets as a retractor to retract the lock tabs and will be described with reference to FIGS. 44-47. Referring first to FIGS. 44 and 45, a weight member 280 includes a weight body 252 that is the same as that of weight member 250, an elliptical spring clip 282, lock tabs 284, and a locking member 286. The elliptical spring clip 282 circumscribes a cam portion 288 of the locking member 286. The cam portion 288 is configured to slide within the elliptical spring clip 282. The lock tabs 284 are fixed to the elliptical spring clip 282 and prevent the elliptical spring from rotating when the cam portion 288 of the locking member 286 rotates relative to the weight body 252. In particular, the lock tabs 284 are disposed in the apertures 264 of the side wall 262 of weight body 252 and are restricted from movement other than radial movement relative to the weight body 252 so the coupling between the elliptical spring clip 282 and the lock tabs 284 also prevents the elliptical spring from rotating with the locking member 286. Preferably, a lubricant is disposed between the elliptical spring clip 282 and the cam portion 288 so that the cam portion 288 slides within the elliptical spring clip 282, and the elliptical spring clip 282 flexes to match the orientation of the cam portion 288 resulting in the lock tabs 284 being selectively extended and retracted.

Figure 46:
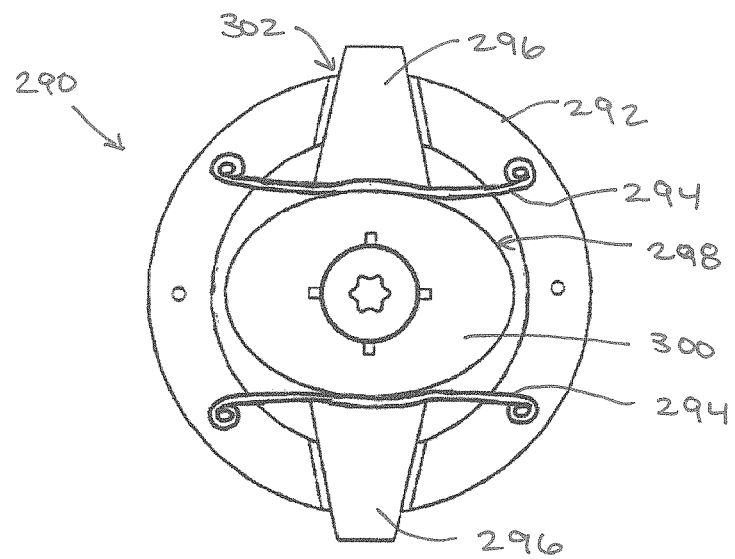
FIG. 46 is a top view of a portion of another alternative construction of the weight member of FIG. 40 in the first configuration.
Figure 47:
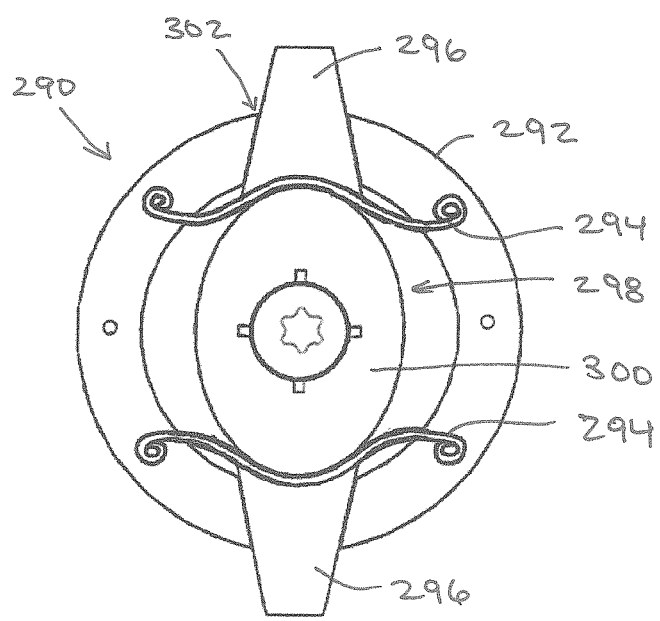
FIG. 47 is a top view of the portion of the weight member of FIG. 41 in the second configuration.
Figure 48:
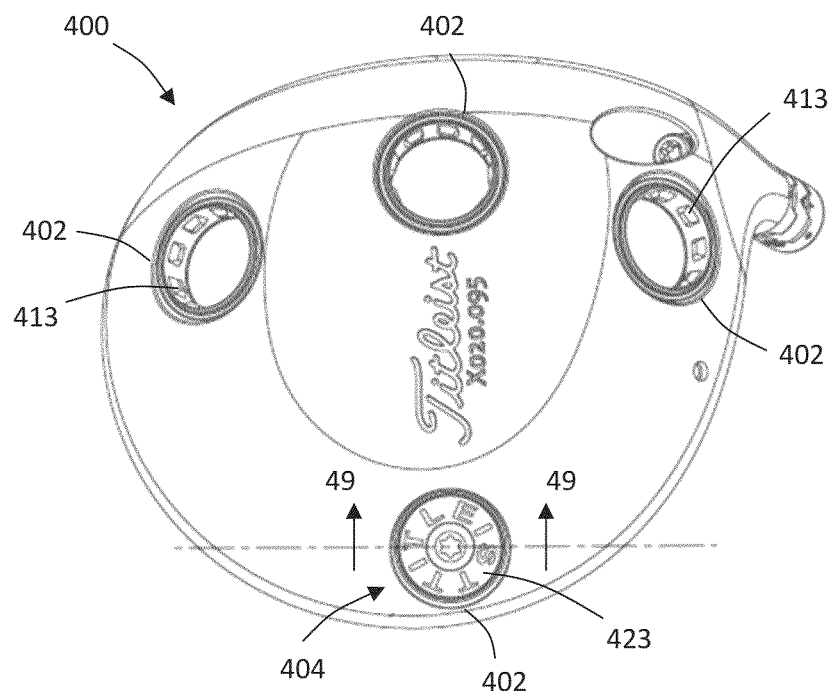
FIG. 48 is a bottom view of another embodiment of a golf club head including a weight member in accordance with the present invention.
Figure 49:
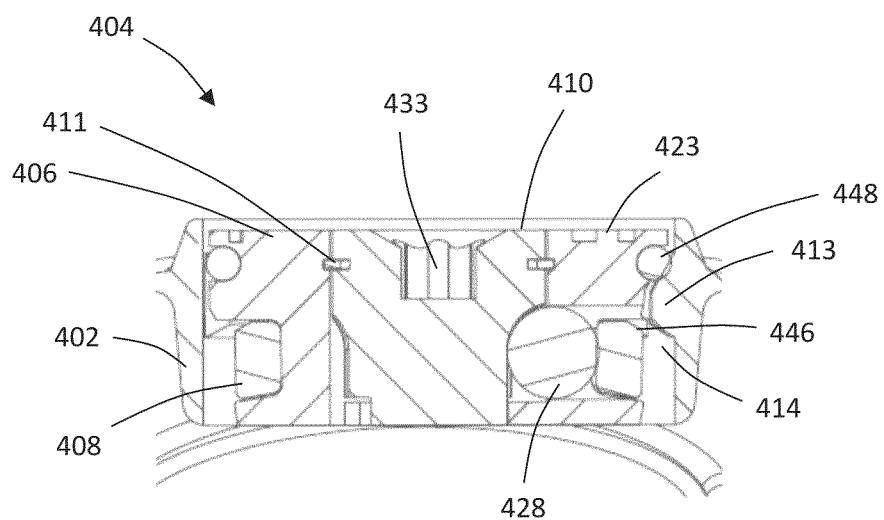
FIG. 49 is a cross-section of the golf club head of FIG. 48, as shown by line 49-49.
Figure 50:
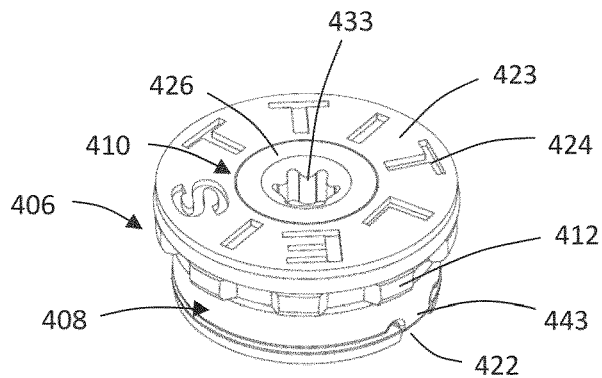
FIG. 50 is a perspective view of the weight member included in the golf club head of FIG. 48.

Now referring to FIGS. 46 and 47, a weight member 290 includes a weight body 292 that is similar to that of weight member 250, a pair of spring clips 294, lock tabs 296, and a locking member 298. The spring clips 294 are mounted in weight body 292 so that they extend across the cavity formed by weight body 292 and abut the sidewall of a cam portion 300 of the locking member 298. The cam portion 300 is configured to rotate within the weight body while in sliding abutment with the spring clips 294. Each lock tab 296 is fixed to one of the spring clips 294 so that as the spring clip 294 is allowed to flex, the lock tab 296 moves radially with the spring clip 294. The lock tabs 296 are disposed in apertures 302 of the side wall 262 of weight body 292 and are constrained to move radially relative to the weight body 292. Preferably, a lubricant is disposed between the spring clips 294 and the cam portion 300 and the cam portion 300 is in sliding abutment with the spring clips 294. The spring clips 294 flex radially as the locking member 298 rotates, and in particular, the lock tabs 296 are extended when a major axis of the generally elliptical cam portion 300 is aligned with the lock tabs 296. Conversely, the lock tabs are pulled inward and retracted by the spring clips 294 when a minor axis of the elliptical cam portion 300 is aligned with the lock tabs 296.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A golf club having a golf club head body, a shaft coupled to the golf club head body, and a grip coupled to the shaft, the golf club further comprising:
    a weight mount disposed in a portion of the golf club head body or the grip, wherein the weight mount includes an aperture and at least one first rotation inhibiting feature within the aperture, wherein the weight mount includes an undercut being a recessed portion below an outer portion of the aperture, wherein the at least one first rotation inhibiting feature is adjacent the undercut, and wherein the at least one first rotation inhibiting feature comprises at least one spline tab, at least one projection, or at least one aperture;
    a weight member comprising a weight body, a spring clip, and a locking mechanism,
        wherein the weight body includes a first flange and includes at least one second rotation inhibiting feature, wherein the at least one second rotation inhibiting feature comprises at least one spline tab, at least one slot, or at least one lock tab,
        wherein the first flange is spaced from a second flange by a clip portion,
        wherein the weight body includes a bore that extends through the first flange and at least a portion of the clip portion,
        wherein the clip portion includes at least one aperture,
        wherein the spring clip is disposed on the clip portion;
        wherein the locking mechanism includes a locking member and at least one roller, wherein the at least one roller is disposed in the at least one aperture in the clip portion, and wherein the at least one roller abuts a cam surface of the locking member and an inner surface of the spring clip;
        wherein the cam surface of the locking member has an outer dimension that is different at different locations around the locking member,
        wherein the locking member is rotatably coupled to the weight body,
        wherein in a first configuration of the weight member the locking member is oriented so that the at least one roller is aligned with a first portion of the cam surface and the spring clip forcibly abuts the at least one roller, wherein in a second configuration of the weight member the locking member is oriented so that the at least one roller is aligned with a second portion of the cam surface and forcibly abuts the spring clip to force the spring clip outward and away from the clip portion of the weight body and into the undercut, and wherein the at least one first rotation inhibiting feature of the weight mount mechanically interlocks with the at least one second rotation inhibiting feature of the weight body so that relative rotation between the weight body and the weight mount is prevented.

2. The golf club of claim 1, wherein the golf club includes a plurality of weight mounts.

3. The golf club of claim 1, wherein the spring clip comprises a clip alignment feature that is a tab, wherein the weight body comprises a body alignment feature that is a slot in the second flange, and wherein the tab extends into the slot.

4. The golf club of claim 1, wherein the locking member includes a circumferential groove in an outer surface, wherein the weight body includes a circumferential groove in an inner surface formed by the bore, and wherein a snap ring extends into the circumferential groove of the locking member and the circumferential groove of the weight body so that the locking member is rotatably coupled to the weight body in the bore.

5. The golf club of claim 1, wherein the spring clip is biased toward the center of the weight member.

6. The golf club of claim 1, wherein the first flange of the weight body is annular, wherein the second flange of the weight body is annular, and wherein the clip portion of the weight body is annular.

7. The golf club of claim 1, wherein the weight mount includes a tapered flange, and wherein the spring clip abuts the tapered flange when the weight member is in the second configuration.

8. The golf club of claim 1, wherein the weight member further comprises a gasket disposed on the first flange of the weight body, and wherein the gasket is disposed between the first flange and the weight mount when the weight member is located in the weight mount.

9. The golf club of claim 1, wherein the cam surface of the locking member includes at least one detent and at least one ramp, and wherein the locking member has a minimum outer dimension on the at least one detent and a maximum outer dimension on the at least one ramp.

10. The golf club of claim 1, wherein the at least one first rotation inhibiting feature comprises at least one spline tab, and wherein the at least one second rotation inhibiting feature comprises at least one spline tab in the first flange.

11. The golf club of claim 1, wherein the at least one first rotation inhibiting feature comprises at least one projection, and wherein the at least one second rotation inhibiting feature comprises at least one slot.

12. A weight member for a golf club head, comprising:
a weight body including a first flange and at least one rotation inhibiting feature, wherein the first flange is spaced from a second flange by a clip portion, wherein the weight includes a bore that extends through the first flange and at least a portion of the clip portion, wherein the clip portion includes at least one aperture, and wherein the at least one rotation inhibiting feature comprises at least one spline tab, at least one slot, or at least one lock tab;
a spring clip disposed on the clip portion; and
a locking mechanism that includes a locking member and at least one roller, wherein the at least one roller is disposed in the at least one aperture in the clip portion, wherein the at least one roller abuts a cam surface of the locking member and an inner surface of the spring clip;
wherein the locking member is rotatably coupled to the weight body, wherein the cam surface of the locking member has an outer dimension that is different at different locations around the locking member,
wherein in a first configuration of the weight member the locking member is oriented so that the at least one roller abuts a first portion of the cam surface and the spring clip forcibly abuts the at least one roller, and
wherein in a second configuration of the weight member the locking member is oriented so that the at least one roller is aligned with a second portion of the cam surface and forcibly abuts the spring clip to force the spring clip outward and away from the clip portion of the weight body.

13. The weight member of claim 12, wherein the spring clip comprises a clip alignment feature that is a tab, wherein the weight body comprises a body alignment feature that is a slot in the second flange, and wherein the tab extends into the slot.

14. The weight member of claim 12, wherein the locking member includes a circumferential groove in an outer surface, wherein the weight body includes a circumferential groove in an inner surface formed by the bore, and wherein a snap ring extends into the circumferential groove of the locking member and the circumferential groove of the weight body so that the locking member is rotatably coupled to the weight body in the bore.

15. The weight member of claim 12, wherein the spring clip is biased toward the center of the weight member.

16. The weight member of claim 12, wherein the first flange of the weight body is annular, wherein the second flange of the weight body is annular, and wherein the clip portion of the weight body is annular.

17. The weight member of claim 12, wherein the weight member further comprises a compressible gasket disposed on the first flange.

18. The weight member of claim 12, wherein the cam surface of the locking member includes at least one detent and at least one ramp, and wherein the locking member has a minimum outer dimension on the at least one detent and a maximum outer dimension on the at least one ramp.

19. The golf club of claim 12, wherein the at least one rotation inhibiting feature comprises at least one spline tab.

20. The golf club of claim 12, wherein the at least one rotation inhibiting feature comprises at least one slot.

* * * * *